United States Patent
Chang et al.

(10) Patent No.: US 10,721,499 B2
(45) Date of Patent: Jul. 21, 2020

(54) LIVE VIDEO STREAMING SERVICES

(71) Applicant: TWITTER, INC., San Francisco, CA (US)

(72) Inventors: Wayne Chang, Boston, MA (US); Suyash Sonwalkar, San Francisco, CA (US)

(73) Assignee: Twitter, Inc., San Francisco, CA (US)

( * ) Notice: Subject to any disclaimer, the term of this patent is extended or adjusted under 35 U.S.C. 154(b) by 0 days.

(21) Appl. No.: 15/083,260

(22) Filed: Mar. 28, 2016

(65) Prior Publication Data

US 2016/0286244 A1  Sep. 29, 2016

Related U.S. Application Data

(60) Provisional application No. 62/139,451, filed on Mar. 27, 2015.

(51) Int. Cl.
*H04N 21/218* (2011.01)
*H04N 21/81* (2011.01)
(Continued)

(52) U.S. Cl.
CPC ... *H04N 21/21805* (2013.01); *H04N 21/2187* (2013.01); *H04N 21/23418* (2013.01);
(Continued)

(58) Field of Classification Search
CPC .......... H04N 21/8133; H04N 21/4223; H04N 21/4788
See application file for complete search history.

(56) References Cited

U.S. PATENT DOCUMENTS 5,729,471 A * 3/1998 Jain .................. H04N 5/222 345/419
8,621,502 B2 * 12/2013 Cronin .................. H04H 60/33 725/10
(Continued)

FOREIGN PATENT DOCUMENTS

| KR | 1020080056588 A | 6/2008 |
| KR | 1020090115344 A | 11/2009 |
| WO | 02/058383 A1 | 7/2002 |

OTHER PUBLICATIONS

Invitation to Pay Additional Fees and Partial Search Report for PCT Application No. PCT/US2016/023483, dated May 30, 2016, 6 pages.
(Continued)

*Primary Examiner* — Pinkal R Chokshi
(74) *Attorney, Agent, or Firm* — Brake Hughes Bellermann LLP

(57) ABSTRACT

In some implementations, a system may include an interactive video broadcasting service, implemented on a server, configured to enable a plurality of source devices to broadcast live feed video streams, over a network, to a plurality of viewing devices. The interactive video broadcasting service includes a multi-perspective video sharing engine configured to determine that at least two of the live feed video streams relate to a same event. The multi-perspective video sharing engine provides a multi-perspective display, over the network, to at least one of the plurality of viewing devices in which the multi-perspective display concurrently streams the live feed video streams determined as related to the same event.

22 Claims, 10 Drawing Sheets

(51) Int. Cl.

| | |
|---|---|
| *H04N 21/4788* | (2011.01) |
| *H04N 21/4223* | (2011.01) |
| *H04N 21/2743* | (2011.01) |
| *H04N 21/2187* | (2011.01) |
| *H04N 21/234* | (2011.01) |
| *H04N 21/8549* | (2011.01) |
| *H04N 21/266* | (2011.01) |
| *H04N 21/233* | (2011.01) |
| *H04N 21/2668* | (2011.01) |

(52) U.S. Cl.
CPC ... *H04N 21/26603* (2013.01); *H04N 21/2743* (2013.01); *H04N 21/4223* (2013.01); *H04N 21/4788* (2013.01); *H04N 21/8133* (2013.01); *H04N 21/8549* (2013.01); *H04N 21/233* (2013.01); *H04N 21/2668* (2013.01)

(56) References Cited

U.S. PATENT DOCUMENTS

| | | | | |
|---|---|---|---|---|
| 8,875,208 | B1* | 10/2014 | Abkairov | H04L 65/60 725/115 |
| 9,344,684 | B2* | 5/2016 | Worrill | H04N 7/181 |
| 10,455,291 | B2 | 10/2019 | Bernstein et al. | |
| 2002/0126120 | A1 | 9/2002 | Snowdon et al. | |
| 2003/0011676 | A1 | 1/2003 | Hunter et al. | |
| 2004/0032495 | A1 | 2/2004 | Ortiz | |
| 2004/0098754 | A1 | 5/2004 | Vella et al. | |
| 2009/0009605 | A1* | 1/2009 | Ortiz | H04N 5/232 348/157 |
| 2009/0128631 | A1* | 5/2009 | Ortiz | H04N 5/232 348/159 |
| 2009/0164484 | A1* | 6/2009 | Horowitz | H04N 7/17318 |
| 2010/0080163 | A1* | 4/2010 | Krishnamoorthi | H04L 12/189 370/312 |
| 2010/0318520 | A1 | 12/2010 | Loeb et al. | |
| 2011/0225515 | A1* | 9/2011 | Goldman | G06Q 10/10 715/757 |
| 2012/0066722 | A1 | 3/2012 | Cheung et al. | |
| 2012/0219271 | A1* | 8/2012 | Vunic | G06K 9/00711 386/278 |
| 2012/0253941 | A1* | 10/2012 | van Bemmel | H04N 21/44222 705/14.66 |
| 2012/0320013 | A1* | 12/2012 | Perez | H04N 5/91 345/207 |
| 2013/0042261 | A1* | 2/2013 | Tavormina | G06Q 30/02 725/5 |
| 2013/0179911 | A1* | 7/2013 | Dang | G06F 3/0304 725/12 |
| 2013/0347046 | A1 | 12/2013 | Bluvband et al. | |
| 2014/0007147 | A1* | 1/2014 | Anderson | H04H 60/33 725/9 |
| 2014/0068676 | A1 | 3/2014 | Lin et al. | |
| 2014/0137144 | A1* | 5/2014 | Jarvenpaa | H04N 21/25891 725/13 |
| 2014/0146177 | A1 | 5/2014 | Pacor et al. | |
| 2014/0150032 | A1* | 5/2014 | Pacor | H04N 21/21805 725/62 |
| 2014/0213362 | A1 | 7/2014 | Perlman et al. | |
| 2014/0294361 | A1* | 10/2014 | Acharya | G11B 27/10 386/241 |
| 2015/0015690 | A1* | 1/2015 | Roh | H04N 5/23219 348/77 |
| 2015/0089520 | A1 | 3/2015 | Lee et al. | |
| 2016/0007052 | A1* | 1/2016 | Haitsuka | H04N 21/2407 725/115 |
| 2016/0057457 | A1* | 2/2016 | Clements | H04N 21/2187 725/109 |
| 2016/0277802 | A1 | 9/2016 | Bernstein et al. | |
| 2016/0294894 | A1* | 10/2016 | Miller | H04L 51/32 |
| 2017/0026680 | A1* | 1/2017 | Sugio | H04N 21/262 |

OTHER PUBLICATIONS

International Search Report and Written Opinion for PCT Application No. PCT/US2016/023483, dated Aug. 8, 2016, 16 pages.
"Livestream on the App Store on iTunes", Livestream, retrieved from: https://itunes.apple.com/us/app/livestream/id493086499?mt=8, 2 pages, 2014.
Geier, Ben, "Everything you need to know about the hot new app Meerkat", Fortune, retrieved from: http://fortune.com/2015/03/09/meerkat-app-guide/, 3 pages, Mar. 9, 2015.
"All about Twitch"; Nov. 30, 2014, Twitch.tv, http://www.twitch.tv/p/about, 2 pages.
"Open Broadcaster Software", Dec. 14, 2014, https://obsproject.com, 2 pages.
DaCrazyCageMan (username), "Do any chat overlay programs fade out when there is no chatter?", Reddit.com, https://www.reddit.com/r/Twitch/comments/2yqfda/do_any_chat_overlay_programs_fade_out_when_there/, Mar. 11, 2015, 2 pages.
DeezjaVu (username), "TeeBoard How To: Chat Widget", https://www.youtube.com/watch?v=2F-1wHA_dpU, May 20, 2014, 1 page.
Extended European Search Report for European Application No. 16773956.4, dated Aug. 14, 2018, 9 pages.
Extended European Search Report for European Application No. 19210127.7, dated Feb. 20, 2020, 9 pages.

\* cited by examiner

LIVE VIDEO STREAMING SERVICES

RELATED APPLICATION

This application is a non-provisional of, and claims priority to U.S. Provisional Application No. 62/139,451, filed Mar. 27, 2015, entitled "Live Video Streaming Services," the disclosure of which is incorporated herein in its entirety.

BACKGROUND

Social media has become a growing part of social life. Social media users can post blogs, photos, comments, messages, locations, feelings, and videos using one or more social media platforms. Many social media users prefer to update and share information from a mobile computing device, such as a smart phone, wearable devices such as glasses and watches, tablets, etc. Such devices, because of their size, often operate with more limited resources than full size counterparts.

SUMMARY

Techniques, methods, and systems are disclosed herein for sharing live-stream video in a social media platform. The live-stream video can be propagated to viewers via a social media platform. A broadcaster of a live-stream video can broadcast to many viewers, e.g., all associations, a limited group of associations, including just one association, or other social media users in general. The associations may be followers, circles, friends, connections, or any other form of association. A selection of viewers for a broadcast can be made programmatically, manually, or both programmatically and manually, based on one or more connection graphs of the platform. The broadcaster may use a camera on the broadcaster's mobile device (or a camera-equipped device connected to the mobile device) and a user interface can allow the broadcaster to stream real-time video to a social media server supporting an interactive video broadcasting service. The broadcaster's device may continually (e.g., at regular periods during the broadcast) determine the throughput for the live-stream video and adjust the video quality to keep latency at around two seconds. The social media server may make the real-time video stream available to other social media users. Thus, the social media server provides a shared broadcast generated by a user without specialized equipment or networks. The live broadcast includes a closed feedback loop in which engagements from viewers are provided to the broadcaster and to other viewers in real time. For example, a viewer may comment on the broadcast, may signal approval for specific moments in the broadcast, and may invite other social media users to join the broadcast. Such engagements are provided back to viewers and the broadcaster within a latency period (e.g., two seconds or less) suitable to allow the broadcaster to react to and interact with the viewers. The broadcaster, for example, may decide to continue the broadcast when the broadcast is popular as suggested by the number of viewers, by a high level of engagements, viewer comments, and other feedback, and/or by the identity of one or more viewers. Optionally, the broadcaster may change one or more aspects of the broadcast based on these or similar information. Implementations enable a viewer to signal approval many times throughout the broadcast, rather than just one time. The social media server may provide representations of these activities to all participants in the broadcast. Thus, the broadcaster and anyone viewing the broadcast may see the comments posted and indications of approval from any viewer. In other words, the engagements form a closed feedback loop with the broadcaster and other viewers.

When a broadcast ends, the social media server may store the broadcast. The broadcast can be stored for only for a period of time, e.g., 2 hours, 24 hours, one week, one moth, etc., or may be stored indefinitely. Viewers may replay the saved broadcast and may see the comments, approvals, and notification messages at the same time in the broadcast that live viewers also saw these elements. In some implementations, the replay viewer may add additional appreciation signals and/or comments. The system may optionally keep metadata for a broadcast and/or broadcaster, so that popular broadcasts and popular broadcasters can be identified. For example, the system may aggregate appreciation signals (received during the live broadcast and the replay), number of viewers, as approvals-per-minute, average approval per broadcast for a broadcaster, etc. (If the system stores or logs information about a broadcast or broadcaster, it provides notices, obtains permissions, and/or implements the appropriate measures to safeguard the information). In some implementations, live broadcasts may also be posted via other social media messages without the interactive capabilities. In some implementations, post-live comments about the message in the other social media platform may be associated with the stored version of the broadcast, e.g. as post-broadcast chat. In addition to propagating knowledge about a broadcast via a connection graph, implementations also include methods for discovering interesting broadcasts based on signals such as location, popularity, topicality, etc.

In addition, techniques, methods, and systems are disclosed herein for supporting one or more enhanced features and functions of an interactive video broadcasting service. For example, the interactive video broadcasting service may provide a multi-perspective experience of a single event from different broadcasters. The various broadcasters may have different viewing angles, positions within the event, and interactions (e.g., engagements, comments, messages, etc.) between their viewers. The interactive video broadcasting service may identify which broadcasts are coming from the same event, and then allow one or more viewers to concurrently display the different live streams so that a user can obtain a multi-dimensional experience of the event that is observed with different perspectives. In some examples, the display screen can be divided (or split) to watch two or more streams at the same time.

The single event may occur at different geographic locations, for example, over a racecourse hundreds of miles long, in which case the service optionally allows one broadcaster to handoff a broadcast of the event to another broadcaster to follow racers as they make their way along the course. Here, there are a series of broadcasters positioned along the racecourse to provide complete coverage of the race. The service provides each broadcaster with a map on which there are icons representing the other broadcasters and their respective geo-locations, and as the racers progress along the racecourse, one broadcaster can select the next broadcaster to whom she can handoff the broadcast by simply clicking on the appropriate icon to notify the next broadcaster, who can accept the handoff and begin broadcasting when ready.

Furthermore, the interactive video broadcasting service may select shortened clips or video summaries (replays) that capture past key activities of a developing event, and provide these replays to viewers who did not begin watching until after the past key activities occurred so they may be brought up-to-date with respect to the live event. After the live stream of the event has stopped, these replays (in addition to the full broadcast) are aggregated chronologically and stored as one or more networked accessible videos so that viewers may opt to watch just the key activities rather than the full event. Optionally, the clips are programmatically selected based on any type and any combination of available information suitable for detecting the occurrence of key activities, examples of which include indications of viewer interest, viewer engagement, and popularity with viewers. An example measure of viewer interest is impression. Example measures of viewer engagement include hearts, comments, and re-Tweets. Example measures of popularity include broadcaster identity, viewer identity, impression, and re-Tweets. (The respective machine learning models for interest, engagement, and popularity may use common information.) Clips are programmatically selected when the measures of interest, engagement, and popularity reach a threshold level suggesting a reasonable likelihood of an occurrence of a key activity. Parameters of machine learning models and the threshold are adjusted to improve accuracy.

Optionally, frames of the live stream broadcast are programmatically analyzed to detect key activities, either during the broadcast or afterwards, and this information is used in conjunction with the information described above to programmatically select replay clips of the broadcast. A change in the appearance of a scoreboard of a softball game is detected, for example, and in conjunction with comments suggesting a home run has been hit and identifying the hitter, and a spike in the number of hearts from viewers connected to the hitter on a social graph, a segment of the broadcast sufficient to capture the home run is selected and made into a replay clip.

In some implementations, a system may include an interactive video broadcasting service, implemented on a server, configured to enable a plurality of source devices to broadcast live feed video streams, over a network, to a plurality of viewing devices. The interactive video broadcasting service includes a multi-perspective video sharing engine configured to determine that at least two of the live feed video streams relate to a same event. The multi-perspective video sharing engine provides a multi-perspective display, over the network, to at least one of the plurality of viewing devices in which the multi-perspective display concurrently streams the live feed video streams determined as related to the same event.

In some implementations, the system may include one or more of the following features (or any combination thereof). The multi-perspective video sharing engine may be configured to determine that at least one or more replays are related to the same event, and the multi-perspective video sharing engine is configured to provide access to the one or more replays in the multi-perspective display. The interactive video broadcasting service may include a video editor configured to edit a broadcasted video stream to create a replay, where the replay is a shorter version of the broadcasted video stream. If the multi-perspective video sharing engine determines that the replay relates to the same event as the live feed video streams, the multi-perspective video sharing engine may provide access to the replay in the multi-perspective display. The video editor may be configured to automatically create the replay from the broadcasted video stream based on user engagements with various portions of the broadcasted video stream. The video editor may be configured to automatically create the replay to have two or more video clips relating to portions of the broadcasted video stream having a level of user engagements equal to or above a threshold level. The live feed video streams relating to the same event may be associated with a single account of the interactive video broadcasting service, and the multi-perspective video sharing engine may include a producer dashboard unit configured to provide a producer dashboard, over the network, to allow a user to edit the multi-perspective display.

The multi-perspective video sharing engine may include a stream correlator configured to correlate two or more live feed video streams and replays to the same event based on one or more signals, where the signals include user-provided engagements with the live feed video streams and the replays, location data, time information, and video analysis and audio analysis of the live feed video streams and the replays. The interactive video broadcasting service may include a video analyzer configured to analyze video of the live feed video streams. The multi-perspective video sharing engine may be configured to determine that the live feed video streams relate to the same event based on results of the video analyzer. The video analyzer may include a recognition unit configured to detect at least one of objects and people in the live feed video streams. The video analyzer may include a frame comparer configured to compare one or more frames of a first live feed video stream to one or more frames of a second live feed video stream. The interactive video broadcasting service may include an audio analyzer configured to analyze audio of the live feed video streams, where the multi-perspective video sharing engine is configured to determine that the live feed video streams relate to the same event based on results of the audio analyzer. The audio analyzer may include a natural language processing (NLP) unit configured to determine keywords from speech of the audio of the live feed video streams. The audio analyzer may include an audio comparer configured to compare sound of a first live feed video stream to sound of a second live feed video stream. The multi-perspective video sharing engine may be configured to detect and read a tag identifier of a physical object in one of the live feed video streams, identify the physical object based on the tag identifier, and use information from the tag identifier in the determination of whether the live feed video streams relate to the same event. The interactive video broadcasting service may include a contextual data inserter configured to insert contextual data about the event into one of the live feed video streams. The interactive video broadcasting service may include a video augmentation unit configured to augment one of the live feed video streams to insert contextual data about the event into frames of video. The interactive video broadcasting service may include a feedback filter unit configured to determine whether a comment related to a live feed video stream from a viewing device is to be presented to a source device that originated the live feed video stream based on user engagements with the comment. The interactive video broadcasting service may include a multi-media feedback unit configured to permit a user of a viewing device to engage with a live feed video stream by transmitting an audio or video stream back to a source device that originated the live feed video stream.

The interactive video broadcasting service may include a video remote controller configured to control an operation of a camera on one of the plurality of source devices that is broadcasting a live feed video stream, where the video remote controller is configured to control the operation of the camera based on user-provided engagements with the live feed video stream provided by the plurality of viewing devices. The interactive video broadcasting service may include a stream and media promoter configured to insert a promoted broadcast stream into the multi-perspective display. The interactive video broadcasting service may be configured to detect and read a tag identifier of a physical object captured in a live feed video stream, where the multi-perspective video sharing engine is configured to identify the physical object based on the tag identifier. The interactive video broadcasting service may include a video augmentation unit configured to augment the live feed video stream to include a selectable representation of the physical object.

In some implementations, a computer-implemented method includes enabling, by an interactive video broadcasting service implemented on a server, a plurality of source devices to broadcast live feed video streams, over a network, to a plurality of viewing devices, correlating multiple live feed video streams to a single event, where the multiple live feed video streams includes a first live feed video stream broadcast from a first source device and a second live feed video stream broadcast from a second source device, and providing a multi-perspective display, over the network, to at least one of the plurality of viewing devices, where the multi-perspective display concurrently streams the first live feed video stream and the second live feed video stream.

In some implementations, the method may include any of the above and/or below features (or any combination thereof). The correlating may include computing a score for each live feed video stream that indicates a level of similarity to another live feed video stream or the single event based on a combination of signals, and determining that a particular live feed video stream is correlated with another stream or the single event when the corresponding score is above or equal to a threshold value. The correlating may include computing a score for each live feed video stream that indicates a level of similarity to another live feed video stream or the single event using a weighted scoring algorithm that applies weights to a plurality of signals, and determining that a particular live feed video stream is correlated with another stream or the single event when the corresponding score is above or equal to a threshold value. The plurality of signals may include user-provided engagements with the live feed video streams, location data, time information, and video analysis and audio analysis of the live feed video streams. The method may further include determining that at least one or more replays are related to the single event, and providing access to the one or more replays in the multi-perspective display. The method may further include automatically creating a replay from a broadcasted video stream, where the replay is a shorter version of the broadcasted video stream, determining that the replay relates to the single event as the multiple live feed video streams, and providing access to the replay in the multi-perspective display. The automatically creating may include automatically creating the replay from the broadcasted video stream based on user engagements with various portions of the broadcasted video stream. The automatically creating may include automatically creating the replay to have two or more video clips relating to portions of the broadcasted video stream having a level of user engagements equal to or above a threshold level.

In some implementations, a non-transitory computer-readable medium storing executable code, that when executed by at least one processor, are configured to cause an interactive video broadcasting service implemented on a server to enable a plurality of source devices to broadcast live feed video streams, over a network, to a plurality of viewing devices, automatically create a replay from a broadcasted video stream from one of the plurality of source devices, correlate a live feed video stream and the replay to a single event, where the live feed video stream originates from a first source device, and the replay originates from a second source device, and provide a multi-perspective display, over the network, to at least one of the plurality of viewing devices such that the multi-perspective display identifies the live feed video stream and the replay.

In some implementations, the non-transitory computer-readable medium may include executable instructions to perform any of the above and/or below functions (or any combination thereof). The executable code to automatically create the replay may include executable code to automatically create the replay from the broadcasted video stream based on user engagements with various portions of the broadcasted video stream. The executable code to automatically create the replay may include executable code to automatically create the replay to have two or more video clips relating to portions of the broadcasted video stream having a level of user engagements equal to or above a threshold level. The executable code to correlate the live feed video stream and the replay to the single event may include executable code to compute a score for at least one of the live feed video stream and the replay using a weighted scoring algorithm that can dynamically adjust weights applied to a plurality of signals.

DETAILED DISCLOSURE

Like reference symbols in the various drawings indicate like elements.

In one implementation, the service described herein provides, in real time or near real time, a crowd-sourced popularity rating for content being broadcasted. Viewers provide approval feedback by, for example, tapping on the screen to indicate they like the content, where the frequency of the tapping provides a general measure of approval for the broadcast, which can be calculated for a single viewer, and/or for the aggregate of all viewers, and/or some subset of all viewers. Moreover, the point in time when the tap occurs also indicates interest in some corresponding event being broadcasted, such that a threshold number of aggregated taps during a broadcast indicates a high probability of the occurrence of an event of high interest. A broadcaster hence has dynamic and real time feedback and can use that information to decide whether to continue broadcasting.

Optionally, other sorts of feedback are available to let the broadcaster know how viewers want the broadcast to be changed. A viewer can indicate her wish for the broadcaster to pan in a particular direction by making a particular gesture, for example, by swiping left or right, or her wish to zoom in or out by another gesture, for example, by pinching in or out. This sort of feedback can be muted such that they will not be relayed to the broadcaster until they reach a threshold level.

Optionally, feedback can be aggregated to indicate community interest in a particular activity the broadcasted has streamed. The broadcaster can hence increase broadcasting the activities that of high interest to her viewers.

In an implementation where the broadcaster elects to participate in an advertising program in which she would permit advertisers to place ads with her broadcasts, the popularity rating for the broadcaster, and/or other ratings based on the described feedback, and/or other sort of information the broadcasted wants to provide to advertisers (e.g., tags describing events being broadcasted and/or information indicating the types of events the broadcaster has frequently streamed), can be applied to enhance the advertising campaign. Such information can be used, for example, to attract advertisers, and/or calculate compensation for impressions and/or conversions.

In one implementation, broadcasts that are recorded are optionally exportable to digital files that can be stored locally and/or remotely and are accessible for replay on different applications, platforms, and devices. A recorded broadcast can be, for example, exported and attached to a Tweet or other social media communication.

Figure 1:
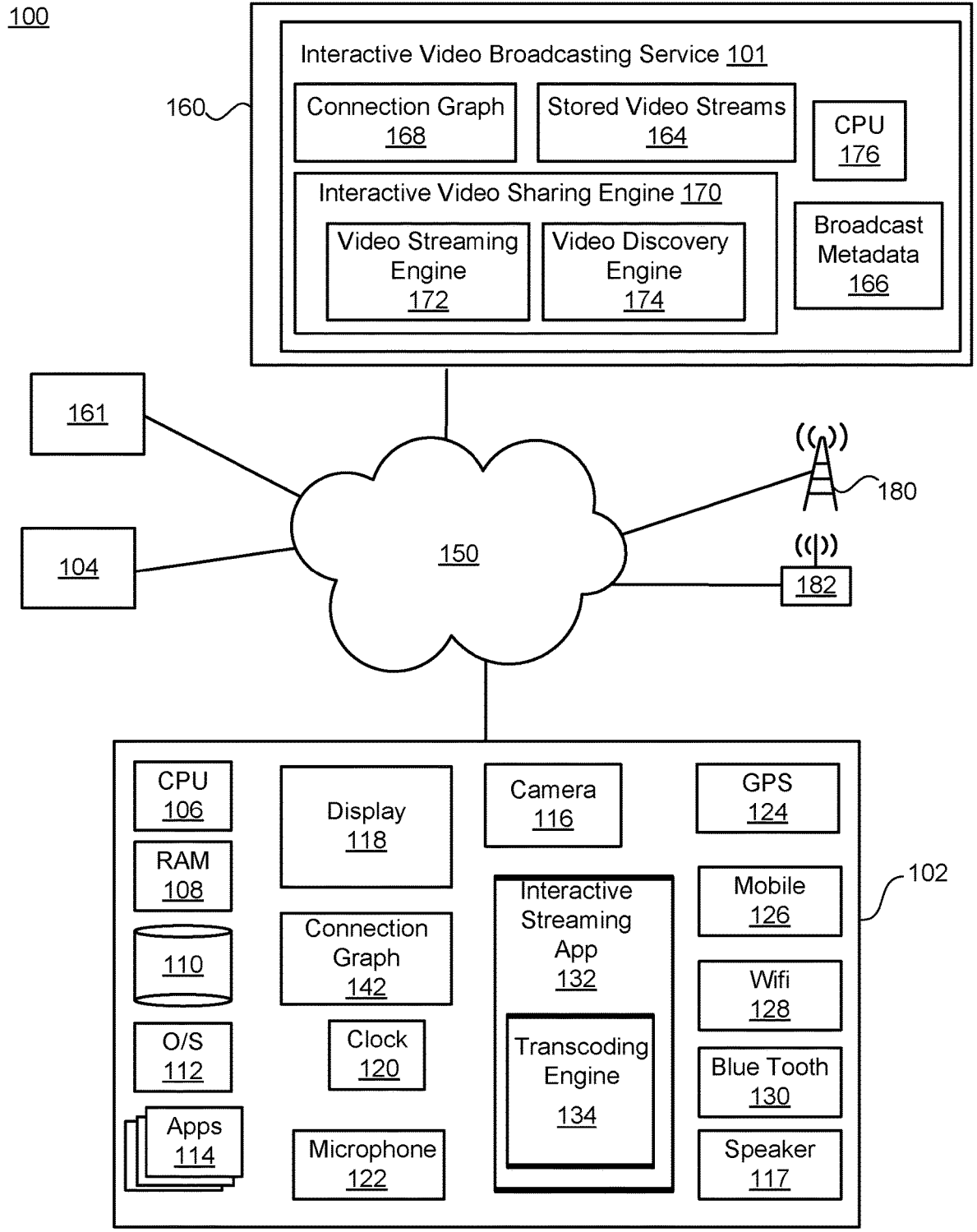
FIG. 1 is a schematic diagram of a system configured to support an interactive video broadcasting service for sharing broadcast streams among users over a network according to an implementation.

FIG. 1 is a schematic diagram of a system 100 configured to support an interactive video broadcasting service 101 executing on a server computer 160 and an interactive streaming application 132 configured to communicate with the interactive video broadcasting service 101 over a network 150 according to an implementation. The system 100 may include one or more computing device(s) 102, 104 connected to one or more server computers 160, 161 through one or more networks 150. Generally, the computing devices 102, 104 may be any type of network-enabled device having a camera or video capturing capabilities. In some examples, the computing devices 102, 104 may be consumer computing devices and can be a mobile computing device (e.g., a smart phone, a PDA, a tablet, a wearable device, such as a wrist or head mounted device, a virtual reality device, or a laptop computer), a robotic computing device (e.g., a drone), and/or a non-mobile personal computing device (e.g., a desktop computing device, internet-enabled television or entertainment system).

As shown in FIG. 1, the computing device 102 may include one or more processors 106 (e.g., a processor formed in a substrate, such as a central processing unit, a graphics processor, etc.), a volatile memory 108, and nonvolatile memory 110. The volatile memory 108 may store, for example, instructions that are executed by the processor(s) 106, and the nonvolatile memory 110 may store, for example, various user data, instructions for executing an operating system, applications, etc. While FIG. 1 illustrates the computing device 102 in more detail than the computing device(s) 104, it is understood that the computing device(s) 104 may include similar components.

The computing device 102 may include a plurality of applications 114, which can be executed by the computing device 102 (e.g., by the processor 106 executing one or more instructions stored in memory 108 or 110 that correspond to the application) and which may communicate with the operating system 112 (e.g., through one or more application programming interfaces (APIs)). Execution of the applications 114 can provide various functionalities to a user of the computing device 102. In a few examples, an email application may, with a user's permission, provide access to the user's email account and email messages associated with the account. A browser application may provide a Web browser to a user, so that the user may access content that can be loaded into, and displayed by, the browser application. A social network application can provide content to the user from contacts and sources that the user has chosen to be associated with within the social media platform associated with the social network application. A camera application can provide access to use of the camera 116 within the computing device 102 for capturing still pictures or video. In some implementations, the camera 116 may be external to the computing device 102, such as a camera that communicates wirelessly, e.g., via BLUETOOTH or Wi-Fi, with the computing device 102. Applications that provide a rich variety of other functionalities and information to the user also can be provided. In some implementations, the interactive streaming application 132 may be considered one of the applications 114.

The computing device 102 includes a display 118 (e.g., a touchscreen display, an LED display, etc.) that can display a user interface for an application 114 that is being executed by the device. More than one application can be executed at a time. However, in some implementations (e.g., in the case of a smart phone), the size of the display is better suited for a single executing application to be displayed at a time. The executing application that is displayed on the display 118 can be referred to as a "front-facing" application. In some implementations, the display 118 may be housed in a structure separate from a structure housing one or more of the other components of the computing device 102 (e.g., the display 118 is a stand-alone display).

The computing device 102 may include internal speakers 117 that can provide an audio output from the device. The computing device 102 may also include a port or interface (e.g., USB, micro-USB, cable interfaces, HDMI, wireless interface, etc.) that can be used to connect the computing device 102 to external devices, e.g., speakers that may provide an audio output when connected to the device 102 or other types of sensors, cameras, or computing devices. The computing device 102 may also include a microphone 122 that detects sound in the environment of the computing device 102. In some implementations, the microphone 122 may be external to the computing device 102. The microphone 122, whether internal or external, may provide audio for a live video stream.

The computing device 102 may also include a clock 120 that determines a time and date and may include a GPS transceiver 124 that communicates with a global positioning system to determine a location of the computing device 102. The location may be provided as part of the metadata associated with a real-time video stream. The computing device 102 also includes various network interface circuitry, such as for example, a mobile network interface 126 through which the computing device 102 can communicate with a cellular network, a Wi-Fi network interface 128 with which the computing device 102 can communicate with a Wi-Fi base station 182, a BLUETOOTH network interface 130 with which the computing device 102 can communicate with other BLUETOOTH devices (e.g., an external camera, microphone, or speakers), and/or an Ethernet connection or other wired connection that enables the computing device 102 to access network 150. The computing device 102 may include other sensors (not shown), such as, for example, an ambient light sensor, a temperature sensor, an accelerometer, etc.

The interactive streaming application 132 may be configured to enable the computing device 102 to communicate with the interactive video broadcasting service 101 over the network 150. The interactive streaming application 132 may be configured to enable the computing device 102 to start a real-time video stream and share the real-time video stream via a social media platform. A video stream is live or real-time when the source of the video stream is a video capture device rather than storage media. The interactive streaming application 132 may be a mobile application, or may be a web-based application. In some implementations, the interactive streaming application 132 may be configured to enable the user to select a privacy setting for the real-time video stream. The privacy setting controls the potential audience for the broadcast stream. A public broadcast is viewable by anyone using the social media platform. The social media platform may provide a message (e.g., push notification) to those directly connected to the broadcaster (e.g. following the broadcaster) in a connection graph, but anyone may join the broadcast. A private broadcast may be viewable only by those selected by the broadcaster. For example, the broadcaster may select some or all of those directly connected to the broadcaster in a connection graph (e.g., connection graph 142 or 168). As another example, the broadcaster may select those who the broadcaster is following who also follow the broadcaster in the connection graph. As another example, the interactive streaming application 132 may enable the broadcaster to select specific individuals (e.g., via a username, phone number, or other identifier) who are target viewers for a private broadcast. The viewers selected by the broadcaster may receive a message (e.g., push notification) about the live broadcast. In some implementations, for a private broadcast only those who receive the push message may review the broadcast. In other words, the target viewers cannot share the broadcast. In some implementations, social media users who are not invited to the broadcast may not be able to view the broadcast unless one of the target viewers sent an invitation to the broadcast, but the broadcaster may disable such sharing by target viewers.

The connection graph 142 may be a subset of the connection graph 168 that resides on the server 160. A connection graph is a data structure representing relationships (i.e., connections) between one or more entities. For example, the connection graph 168 may be a data set that stores relationships between social media accounts. Relationships may include friending, following, linking, or some other relationship. An entity is directly connected to another entity in the connection graph when the two entities are connected by a path length of one, i.e., there are no intervening nodes.

After receiving a request from the user who wants to begin a broadcast, the interactive streaming application 132 may be configured to use various components of the computing device 102 or components in communication with computing device 102 to capture and send a real-time video stream and to display interactions (e.g., engagement representations) from viewers of the real-time video stream. For example, the interactive streaming application 132 may use the camera 116, the GPS 124 (or other location-obtaining sensors), and the microphone 122 of the computing device 102 to capture a real-time video stream with audio. In some implementations, the GPS 124 may associate a location with the real-time video stream.

The interactive streaming application 132 may include a transcoding engine 134, which may be configured to determine the throughput between the device 102 and the server 160 via networks 150. The throughput represents the bandwidth available to transmit the real-time video stream from device 102 to the server 160. When bandwidth is low the transcoding engine 134 is configured to reduce the video quality sent to the server 160. This differs from conventional streaming systems where the server 160 determines the video quality sent to each viewer based on the viewer's connection. In contrast, the interactive streaming application 132 decides the video quality for all viewers based on the bandwidth available to the broadcasting device 102. This ensures that latency is kept low, e.g., a few seconds or less. The low latency ensures that engagements are relevant to the broadcaster—in other words, the broadcaster receives almost real-time engagements. A latency more than a few seconds, and certainly a latency of 30 seconds or more would make engagements too old to provide effective communication between the broadcaster and the viewers.

The interactive streaming application 132 may also be configured to attach a timestamp packet to the frames of the real-time video stream provided from device 102 to the server 160. This special packet enables the server 160 to associate an engagement with a particular time in the live feed broadcast. The interactive streaming application 132 may also be configured to use one of the computing components (e.g., Wi-Fi network interface 128, mobile network interface 126, etc.) to provide the real-time video stream, over the network 150, to a server, such as servers 160, 161. The interactive streaming application 132 may also be configured to receive engagement indications as well as metadata about the real-time video stream from the servers 160, 161. The engagement indications may be in a data stream that is associated with the video stream. The metadata may include information such as how many viewers have joined the real-time video stream and are currently viewing the video stream. The engagement indications may represent feedback and information from the viewers of the video stream. For example, the engagements may include comments, signals of appreciation, share notifications, viewer join notifications, etc. The interactive streaming application 132 may be configured to receive the data stream and to generate representations of the engagement indications in the data stream and provide the representations to the display 118.

For example, a signal of appreciation may be represented by an icon. The icon may be a heart shape, a star shape, a smiley face shape, or some other shape. The interactive streaming application 132 may be configured to add an icon to the display 118 during the real-time video stream for each signal of appreciation. Each signal of appreciation may be received from one of the viewers of the real-time video stream. A viewer may send a plurality of signals of appreciation during the real-time video stream, so that a viewer is not limited to signaling appreciation for the video stream only once. Instead, the signals of appreciation may be associated with a particular moment of time in the real-time video stream and a viewer can send as many signals as desired. In some implementations, the icon representing a signal of appreciation may have a different appearance for each viewer. In other words, other viewers and the broadcaster may be able to determine how many different viewers are sending signals of appreciation based on the appearance of the icon. For example, signals of appreciation for a first viewer may be blue hearts, signals of appreciation for a second viewer may be orange hearts, signals of appreciation for a third viewer may be purple hearts, etc. Thus, each of the engagement indications may be associated with a particular viewer and the engagement representation generated by the interactive streaming application 132 for the indication may reflect a different user. In some implementations, the system may change the icon for some or all of the signals of appreciation to match a date, such as a holiday or occasion. For example, instead of hearts, on St. Patrick's Day, the system may display signals of appreciation as clovers and on the Fourth of July as stars. In some implementations, the system may only change the icon for the signal of appreciation for every nth icon, e.g., so that every fifth or every seventh signal of appreciation is represented by a heart or start. In some implementations, the system may change the icon for some or all of the signals of appreciation based on a topic (e.g., hashtag) identified in the content of comments. For example, if the system determines that a live video stream relates to a birthday celebration, the system may display every tenth signal of appreciation as a birthday cake icon.

The interactive streaming application 132 may be configured to trigger the display of the icons (e.g., representations of signals of appreciation) for a predetermined period of time. For example, each icon may appear on the display 118 of the computing device 102 for three or five seconds and then disappear or fade out. The engagement may be associated with a specific time, e.g., a timestamp from a timestamp packet in the video stream, and an engagement may be displayed during a period that starts at the timestamp until the predetermined period of time expires. In some implementations, the interactive streaming application 132 may be configured to animate the icons on the display 118 while displayed. For example, the interactive streaming application 132 may cause the icons to move from a first location to a second location during the predetermined period of time. The movement need not be linear, but may be in a general direction. For instance, the icon may float up or sink down a side edge of the display 118 or move generally across a top or bottom edge of the display 118 during the predetermined time. The interactive streaming application 132 may be configured to display and animate a plurality of the icons, each icon representing a single signal of appreciation. The icons may overlap with each other in the display.

The interactive streaming application 132 may also be configured to trigger the display of engagement notifications, such as comments from viewers, viewer join notices, and viewer share notifications. The engagement notifications may be displayed with the real-time video stream (and the icons representing signals of appreciation). Like the icons, the engagement notifications may be associated with a moment in time (i.e., a timestamp) and displayed for a predetermined period of time after the moment in time, so that after the predetermined time the notification fades out, for example. The interactive streaming application 132 may scroll comments, so that older comments are moved up (or down or sideways) to make room for new engagement notifications. Thus, while a user of the computing device 102 is providing a real-time video stream, the user of the computing device 102 may also receive real-time feedback from the viewers of the real-time video stream. In some implementations, the interactive streaming application 132 may also be configured to allow the user to share the real-time video stream via the social media platform. When the user shares the video stream, the interactive video sharing engine 170 may be configured to send a message to user accounts directly connected to the user in a connection graph for the social media platform. In some implementations, the message may be a push notification or an email with a control (e.g., link) that allows the invited user to join the video stream. In some implementations, the targeted viewer (e.g., the viewer receiving the notification) may join via a computing device with the interactive streaming application 132 installed. In some implementations, the targeted viewer may join via a browser application or another mobile application without using the interactive streaming application 132, which may include viewing the real-time video without engagements.

In some implementations, when there are more than a threshold number of viewers on a particular broadcast video stream, the interactive video broadcasting service 101 may limit the chat functionality to a predefined number such as the first N viewers of the broadcast. The other viewers may be placed on a waiting list. When an early viewer leaves the broadcast, the next-in-line viewer may participate in chat. In other words, the interactive video broadcasting service 101 may queue the viewers of a particular broadcast video stream in the order of arrival time, and permit the first N viewers from the top of the queue participate in chat. The viewers allowed to participate in chat may be able to provide the full range of engagements such as comments, messages, and indications of approval. However, the other viewers may not be able to provide messages or comments back to the broadcaster. In other examples, the interactive video broadcasting service 101 may arrange the viewers in the queue according to a ranking scheme. For example, high credibility users and/or associations (e.g., friends, followers, etc.) of the broadcaster may have a priority in the queue. For instance, the interactive video broadcasting service 101 may bump these types of viewers to locations that are higher in the queue. Also, the interactive video broadcasting service 101 may remove certain messages that have a relatively low engagement level (e.g., not many indications of approvals or likes) or messages that have been flagged for various reasons. Also, the interactive video broadcasting service 101 may use a queue that is more user or context specific. In other words, the queue (or the chat-enabled list) can be user-specific (context specific). For example, all users can be enabled (to enter the queue) but only certain chats may be surfaced to each viewing user. Comments from associations of the viewing user (context user) can be surface from that user, comments from viewers having relevance or interest to the viewing user can be surfaced to that user, blocked users can be ignored that user, etc.

In some implementations, the interactive video broadcasting service 101 may enable the live broadcast to be posted via other social media platform messages. Such posts may include the video stream but may lack the interactive capabilities. Thus, for example, a social media user in a different platform can receive a message formatted for the different platform that includes the video stream that the social media user can watch. Such a message can include a suggestion that the social media user download and install a version of the interactive streaming application 132, or include a link or other control that opens the interactive streaming application 132 or initiates the install. In some implementations, the server 160 may associate comments about the message from the other social media platform with a stored version of the broadcast, e.g. as post-broadcast chat engagements.

The interactive streaming application 132 may be configured to provide the real-time video stream from a broadcasting computing device 102 to a server, such as the servers 160, 161. The server 160 may be a single computing device, or may be a representation of two or more distributed computing communicatively connected to share workload and resources. In some implementations, the server 160 is a social media platform server. The server 160 may also include one or more processors 176 formed in a substrate configured to execute instructions. The instructions may be stored in memory, such as RAM, flash, cache, disk, tape, etc. In addition, the server 160 may include one or more data stores configured to store data in a persisting manner. For example, the server 160 may store the connection graph 168. The connection graph 168 may be a data structure representing relationships (i.e., connections) between one or more entities. For example, the connection graph 168 may be a data set that tracks relationships between social media accounts. Relationships can include friending, following, liking, linking, or some other relationship. In some implementations the connection graph 168 may represent entities that have installed an interactive streaming application 132 and set up a user account through the interactive streaming application 132.

In some implementations, the connection graph 168 may represent entities from more than one social media platform or entities that have installed various social media applications. Thus, the connection graph 168 may be understood to represent multiple distinct data sources, each representing a separate set of entities and relationships for separate social media platforms. In some implementations, a first user account in one data store may include an identifier for a second user account in a second data store, where the first user account and the second user account correspond to a single human user. Thus, the interactive video sharing engine 170 may be able to access the second data store via the link between the first user account and the second user account. The system may thus access a second social media platform via such connected accounts. The human user may have control over such connections.

The server 160 may also store broadcast metadata 166. Broadcast metadata 166 may store data, e.g., information and statistics, for real-time broadcasts and/or broadcasters. The data may include the engagements received during the live broadcast (and in some implementations, from replays (e.g., replays 220 of FIG. 2) of the stored broadcast), time stamps, duration, the total quantity of viewers, how long each viewer watched the real-time broadcast, etc. The server 160 may also store stored video streams 164 for a limited time. For example, when a broadcaster completes a real-time broadcast, the broadcaster may choose to make the video stream available for replay. Accordingly, the server 160 may store the video stream in stored video streams 164. The stored video stream may include the engagement indications associated with the video stream. In other words, when the stored video stream is replayed, the viewer watching the replay may also see any engagements received during the real-time video stream.

The server 160 may also include an interactive video sharing engine 170. The interactive video sharing engine 170 may service a social media platform, and thus, have access to the connection graph 168 for the social media platform. The interactive video sharing engine 170 may include a video streaming engine 172 and a video discovery engine 174. The video streaming engine 172 may be configured to provide the transcoded video stream, including any added engagement indications, to client viewing devices (i.e., other instances of device 102) in a format appropriate for a particular client viewing device. The interactive video sharing engine 170 may be configured to receive the video stream from a broadcasting computing device 102 (e.g., smartphone or wearable computing device) and to provide it in a variety of different formats or playback on viewing computing devices 102. Thus, the interactive video sharing engine 170 may convert the live video stream from the broadcaster into a plurality of formats and, when a viewing computing device 102 joins the real-time video stream, the video streaming engine 172 may select, based on information about the viewing computing device 102, an appropriate format for the viewing computing device 102. The interactive video sharing engine 170 may be configured to receive engagements from the viewing computing devices 102 and provide engagement indications with the video stream provided to the various computing devices 102. The interactive video sharing engine 170 may also provide the engagement indications to the broadcasting computing device 102. The engagement indicators may be associated with a particular time in the real-time video stream. For example, an engagement may be associated with the time represented by a timestamp packet associated with the video frame displayed when the engagement was received.

The interactive video sharing engine 170 may be configured to receive a request to start a real-time video stream from a broadcasting computing device 102. The request may include information from which the interactive video sharing engine 170 can determine target viewers. For example, the interactive video sharing engine 170 may use the connection graph 168 to determine user accounts directly related to the account for the broadcaster. These directly related user accounts may receive a message, for example a push notification, regarding the broadcast. In some implementations, only user accounts that have a "following" relationship with the account corresponding to the broadcaster may receive the message. When the broadcast information indicates the broadcast is private, the information may include identifiers (e.g. user account identifiers) for user accounts that can receive the message (e.g., push notification) about the live video stream. Thus, in some implementations, a private broadcast may be for a subset of the user accounts directly related to the broadcaster account in the connection graph 168 (e.g., followers, friends, circles, or other forms of associations), whereas a public broadcast can be joined by anyone, but only accounts directly related to the broadcaster are notified of the live video stream.

Based on the information received with the real-time video stream and the connection graph 168, the interactive video sharing engine 170 may send messages to the targeted viewers. The message may be in the form of a push notification, but can be an email, or a text that includes a link or activation that connects the target viewer to the real-time video stream. In some implementations, the targeted viewer may only view the real-time video stream if the computing device 102 used by the targeted viewer has an interactive streaming application 132 installed. The interactive streaming application 132 may be a mobile application or a browser-based application. Once a targeted viewer chooses to join the real-time video stream, the video streaming engine 172 may provide the encoded real-time video stream to the viewer, e.g., via computing device 102 or 104.

The interactive video sharing engine 170 may be configured to receive engagements from viewers, associate an engagement with a moment of time, and provide engagement indications with the video-stream to viewing computing devices and the broadcasting device. An engagement is some type of interaction from one of the viewers. For example, a signal of appreciation is a type of engagement where a viewer expresses approval at a particular moment during the real-time video stream. Another example of an engagement is a comment provided by a viewer. The moment in time may be represented by the time in a timestamp packet associated with the frame that was being displayed when the engagement was received by the client device. Another example is a share, which may have a corresponding share notification telling other viewers and the broadcaster that a viewer has invited other viewers. In some implementations, only a public broadcast may allow sharing. In some implementations, the broadcaster can control whether viewers can invite other viewers to a private broadcast. Another example of an engagement is a new viewer joining the broadcast, which may be associated with a new viewer notification alerting the broadcaster and other viewers of the new viewer.

The video streaming engine 172 may provide indications of the engagements with the video stream to encourage interaction among the viewers and broadcaster. In some implementations, the interactive video sharing engine 170 may aggregate the different types of engagements, generating statistics for the broadcast. For example, the interactive video sharing engine 170 may track the number of signals of appreciation received from all viewers per minute, track the total number of signals of appreciation, track the comments per minute, track the total number of comments, track the total number of viewers, track the average viewing time of the viewers, track the number of shares, etc. The statistics may be stored in the broadcast metadata 166. The broadcast metadata 166 may be used to feature popular broadcasts (e.g., measured by number of viewers, average of signals of appreciation per second correspondence with social media messages or other broadcasts, etc.) for replay, to suggest popular broadcasters (e.g., based on total number of signals of appreciation received over all broadcasts or based on a high average number of signals of appreciation per second across all the broadcasts for the broadcaster, etc.), to notify potential audience members about a popular live broadcast.

The video discovery engine 174 may enable the interactive video sharing engine 170 to suggest real-time video streams and/or stored video streams, e.g., in stored video streams 164, to a viewer. In some implementations, the video discovery engine 174 may use the broadcast metadata 166 to provide or suggest real-time video streams to a user. For example, the video discovery engine 174 may suggest a real-time video stream that has received many signals of appreciation in a short duration, a real-time video stream that has a quantity of viewers that exceeds a threshold, a real-time video stream that has an average number of engagements per second that exceeds a threshold, etc. The video discovery engine 174 may boost the position of a real-time video stream in the search result based on attributes of the user. For example, the video discovery engine 174 may boost a real-time video stream associated with a known interest of the user in the search result. The video discovery engine 174 may determine an interest for the real-time video stream based on words in the title or comments, or landmarks identified in the video stream. For example, the video discovery engine 174 may determine that a real-time video stream titled "Vail black diamond" is associated with skiing, which maybe a known interest of a particular user and the video discovery engine 174 may boost the ranking of this video stream for that user in a list of suggested video streams. Similarly, the video discovery engine 174 may associate the video stream with skiing based on the content of the comments.

In some implementations, the video discovery engine 174 may use other social media messages to determine an interest for the user. For example, a user may post or re-post messages in a first social media platform that include hashtags. A hashtag may be used to identify messages about a particular topic and can be used to identify trending topics. The video discovery engine 174 may be in communication with the first social media platform and may identify topics the user has recently posted and may give any real-time video streams that include the topic in the comments (e.g., use the same or similar hashtag) a position of prominence in a list of suggested real-time video streams for that user. As another example, the video discovery engine 174 may determine a topic, e.g., related to one or more hashtags, that is trending, or in other words being used by many different users of the first social media platform. Any real-time video streams that also include comments with that topic may be listed in a position of prominence in a list of suggested real-time video streams for users of the interactive streaming application 132.

The video discovery engine 174 may also use location data to suggest real-time video streams for viewing. For example, the video discovery engine 174 may identify several real-time video streams that are in close proximity to each other. Such real-time video streams may be an indication of an important event occurring at the location. The video discovery engine 174 may suggest one or more of these real-time video streams (e.g., selected at random, based on past popularity of the broadcaster, based on number of viewers of the stream, etc.) as a suggested real-time video stream. In some implementations, the video discovery engine 174 may initiate a user interface that shows the location of the real-time video streams and enables a user to select one of the real-time video streams for preview of viewing. For example, the user may navigate in a map that includes an icon representing the location of live video streams and the user may select an icon to join or preview the live video stream associated with the location.

In some implementations, the video discovery engine 174 may receive a query from a user and search titles of live video streams and/or comments provided in live video streams and provide video streams with responsive titles or comments in a search result to the viewer. The video discovery engine 174 may also search titles and comments for stored video streams and provide one or more stored video streams in the search result. Although described above as a live video stream search tool, the video discovery engine 174 may use similar techniques to search and surface recorded video streams, e.g., those stored in stored video streams 164. The video discovery engine 174 may interact with a user in the interactive streaming application 132 to receive input from the user and display results, e.g., a list of live or stored video streams, to the user.

The interactive streaming application 132 executing on the computing device 102 may also be configured with a viewing user interface that enables a potential viewer to receive a notification about a live video stream, join the stream, and provide feedback in the form of comments or signals of appreciation, to invite others (when approved by the broadcaster), and to share via a social media platform. The interactive streaming application 132 may also be configured to enable a user of the computing device 102 to update the connection graph (e.g., connection graph 168 and/or 142) to enable the user to receive notifications to join real-time broadcasts from a particular account (e.g., an account of the social media platform). For example, the interactive streaming application 132 may help a first user account follow or like a second user account, so that broadcast notifications from the second user account are presented to the first user.

The interactive streaming application 132 may be configured to display messages regarding live video streams. A live video stream is one that occurs in real-time, as the broadcaster captures the image. In other words, in a live or real-time video stream the source of the video stream is a video capture device (e.g., camera 116). In contrast, the source of a replay of a video stream is storage media. If a user chooses to view the live video stream, the interactive streaming application 132 may display the real-time video stream on the display 118 of the viewer's computing device 102. The interactive streaming application 132 may also be configured to enable the user to provide engagements during the live video stream. For example, when a user provides an appreciation gesture, such as a tap on a touch screen display 118 or use of an input device, such as a mouse, to click in the display 118, while watching the live video stream, the interactive streaming application 132 may interpret the tap or click as a signal of appreciation. The interactive streaming application 132 may provide information about the signal of appreciation to the server 160. The information about the engagement may include an identifier for who provided the signal and when it was provided, for example by identifying the time in the timestamp packet associated with the frame being displayed when the engagement was received. At the server 160, the video streaming engine 172 may receive the engagements and may provide information about the engagements to the viewers and the broadcaster. This information may be used, at each computing device 102, 104, to generate representations of the engagement, as described above. Thus, the video streaming engine 172 provides information to all participants participating in the real-time video stream about engagements from any of the viewers.

The interactive streaming application 132 may also enable a viewer to enter comments, which are provided to the interactive video sharing engine 170 at the server 160. The interactive video sharing engine 170 may provide information about this engagement, such as the initials or username of the viewer providing the comment, as well as the content of the comment and a timestamp for the comment, to viewing devices. In addition to comments, the interactive streaming application 132 may enable a viewer to invite others to view the live video stream. For example, anyone connected to the viewer via the connection graph 168 or 142 may receive a message with an invitation to join the live video stream. The interactive streaming application 132 may also enable a viewer to leave the broadcast or rejoin the broadcast at any time.

Once a broadcast completes, the interactive video sharing engine 170 may store the video stream formats and the engagement indications that correspond to the video stream, for example storing them in the stored video streams 164. In some implementations, the broadcaster can prevent the video stream from being stored at the server 160. The interactive video sharing engine 170 may store the engagement indications with the stored video stream, as well as the broadcast metadata. The interactive video sharing engine 170 may delete the stored video stream after the limited time expires. For example, the interactive video sharing engine 170 may delete any saved video streams that are more than 12 or 24 hours old, depending on the length of the limited time. In some implementations, the interactive video sharing engine 170 may enable viewers to select a stored video stream for replay. In some implementations, only those in the original audience (e.g., those indicated by the broadcaster in a private broadcast, or only those following a broadcaster) may replay the video stream. In some implementations any viewer may replay the stored video stream.

During replay of a stored video stream, the interactive video sharing engine 170 may receive additional engagements from the replay viewer. In some implementations, the interactive video sharing engine 170 may aggregate the engagements with the broadcast metadata 166 for the stored video stream. For example, if the replay viewer provides several signals of appreciation, the interactive video sharing engine 170 may add these to the statistics for the broadcast. In some implementations, the interactive video sharing engine 170 may optionally add the engagements to the stored video stream. For example, the signal of appreciation from the replay viewer may be assigned a time and engagement indicator in the stored video stream. In some implementations, a replay engagement may include sharing the stored video stream. Sharing may include sending a message, e.g., via a social media platform, with a link or other element that enables others to find and replay the stored video stream.

In some implementations, the interactive streaming application 132 may provide a user interface that enables a user of the computing device 102 to select a stored video stream for replay. For example, the server 160 may store video streams for a limited time (for example 12 or 24 hours). This provides an opportunity for targeted viewers (e.g., followers, friends, circles, or other associations receiving a push notification) who missed the live video stream to view a stored version of the video stream. The replayed version includes all engagement indications received during the live video stream. Thus, the replay viewer can experience the interactions that occurred during the live video stream. In some implementations, the replay viewer may also be able to add engagements to the stored video stream. In other words, a replay viewer may add signals of appreciation and/or comments. In some implementations, these engagements may be aggregated with metadata for the broadcast, for example in broadcast metadata 166. In some implementations, the new engagement indications may be stored with the stored video stream, so that other replay viewers watching the stored video stream at a subsequent time can see the new engagements added after the live video stream ended.

Figure 2:
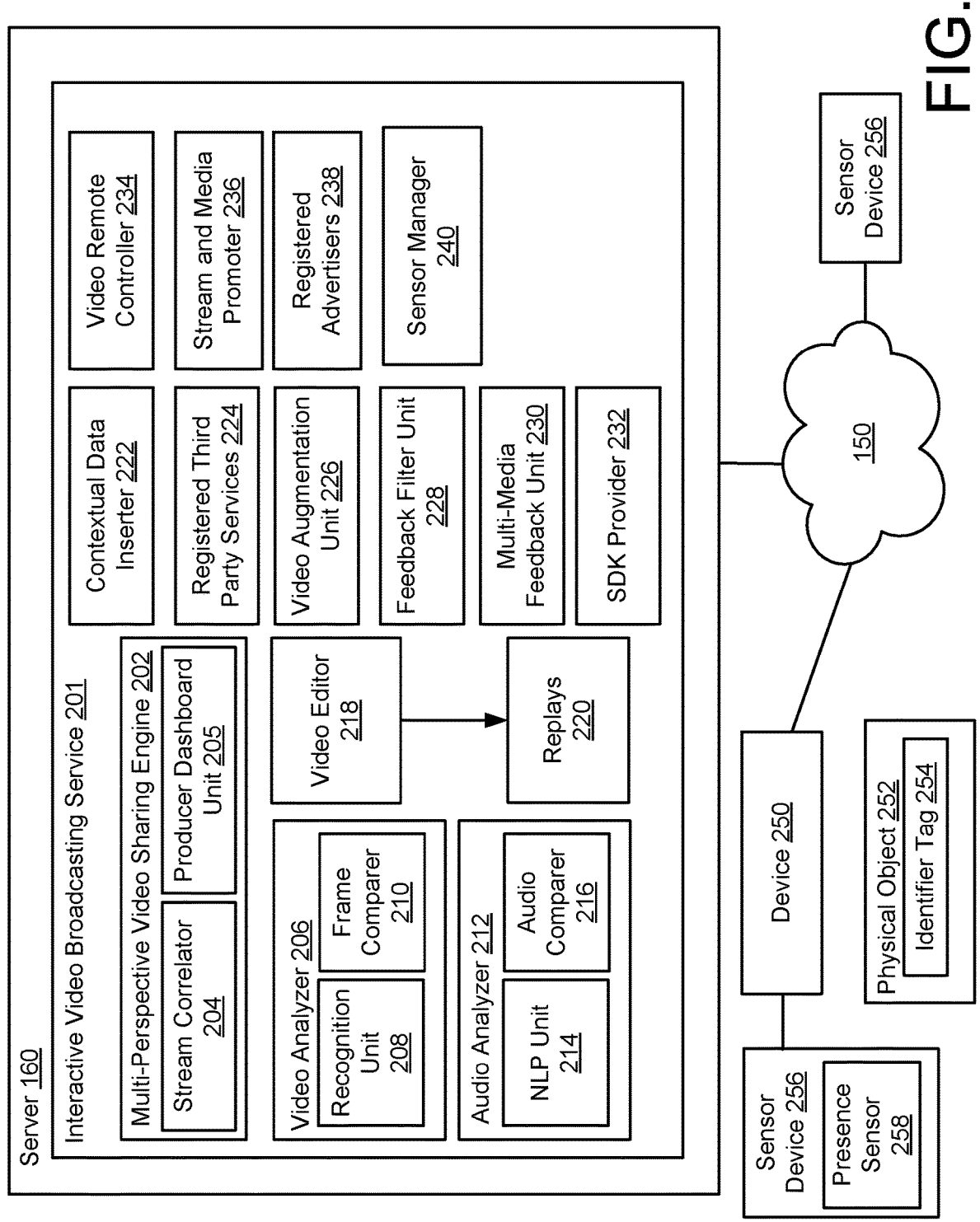
FIG. 2 is a schematic diagram of a system configured to support one or more enhanced features and functions of the interactive video broadcasting service according to an implementation.

FIG. 2 is a schematic diagram of a system 200 configured to support one or more enhanced features and functions of an interactive video broadcasting service 201 executing on the server 160. The interactive video broadcasting service 201 may also include the components explained with reference to FIG. 1 such as the connection graph 168, the stored video streams 164, the interactive video sharing engine 170 having the video streaming engine 172 and the video discovery engine 174, the CPU 176, and the broadcast metadata 166. A device 250 may communicate with the interactive video broadcasting service 201 over the network 150 in order to permit broadcasters to share their broadcast streams with other users. The device 250 may be the computing device(s) 102, 104 explained with respect to FIG. 1.

In some implementations, the interactive video broadcasting service 201 may include a multi-perspective video sharing engine 202 configured to create a multi-perspective experience of the same event from different broadcasters or different video capturing devices. For instance, the broadcasters can be from multiple video sources (e.g., smartphone camera, additional activity cameras, drone cameras, etc.) and audio sources (e.g., built-in mic, external mics, sound audio overlays etc.). For example, a number of people at a certain event may be using their devices 250 to share their live broadcasts with other viewers. The various broadcasters may have different viewing angles, positions within the event, and interactions (e.g., engagements, comments, messages, etc.) between their viewers. The multi-perspective video sharing engine 202 may identify which live broadcasts are coming from the same event, and then allow the viewers to concurrently display the different live streams from the same event in the user interface so that a user can obtain a multi-dimensional experience of the event that is observed with different perspectives. Furthermore, in some examples, the multi-perspective video sharing engine 202 may identify shortened clips or video summaries (e.g., replays 220) that capture past activities of the developing event, and provide these videos to the user so that the user may review one or more of these replays in order to be brought up-to-date with respect to the live event. These features are further explained below.

In some cases, the event is planned, and the broadcasters are known (and therefore the video streams are known to be from the same event). In one example, the various broadcasters may share the same account, which is affiliated with the event. For instance, the account may be associated with a producer, event representative, or event sponsor. In some implementations, the multi-perspective video sharing engine 202 may include a producer dashboard unit 205 configured to provide a producer dashboard to manipulate one or more of the video streams. For example, the producer dashboard unit 205 may enable the user to have multiple feeds from the same account, and provide various editing capabilities such as video/audio overlays, video augmentation, addition of color and/or additional text, embedding video content or a link to video content in social media messages that are pushed out on social media platform(s), and/or muting or narrating over the video stream or a portion thereof.

The producer may use the producer dashboard to define the number of feeds and the multi-feed arrangement on the display. In other examples, the user may select which video streams to view. For example, the user may be able to select a live video stream from one of the possible choices via the user interface, and the multi-perspective video sharing engine 202 provides that broadcasted video stream to the viewing device 250. In some examples, the user is able to select multiple video streams from multiple broadcasts via the user interface, and the multi-perspective video sharing engine 202 aggregates the multiple video streams to provide a concurrent display of the live broadcast streams in the same user interface at the same time so that the user can observe the event simultaneously from various perspectives. Also, this experience is enriched by the exchange of comments and other engagements that are unique to each broadcast stream (e.g., the perspective and exchange of messages and engagements are unique between each broadcaster and the corresponding viewers) such that the user obtains a rich experience from multiple different perspectives at the same time. In one example, one video stream may be captured from a camera-mounted device (e.g., helmet cam, drone, etc.), and another video stream may be captured from a mobile device, and these two video streams may be concurrently displayed (e.g., via a split screen).

In some examples, the multi-perspective video sharing engine 202 may dynamically switch between different broadcasters (e.g., broadcaster pass-off) by switching the broadcast to a different device operated by a different broadcaster. A single event may occur at different geographic locations, for example, over a racecourse hundreds of miles long, in which case the interactive video broadcasting service 201 optionally allows one broadcaster to handoff a broadcast of the event to another broadcaster to follow racers as they make their way along the course. Here, there are a series of broadcasters positioned along the racecourse to provide complete coverage of the race. The multi-perspective video sharing engine 202 may provide each broadcaster with a map on which there are icons representing the other broadcasters and their respective geo-locations, and as the racers progress along the racecourse, one broadcaster can select the next broadcaster to whom she can handoff the broadcast by simply clicking on the appropriate icon to notify the next broadcaster, who can accept the handoff and begin broadcasting when ready. In other examples, a producer of the event may use the producer dashboard provided by the producer dashboard unit 205 to control the broadcaster handoff. For instance, instead of an individual broadcaster selecting the next broadcaster, the producer (which may or may not be one of the broadcasters along the racecourse) may use the producer dashboard to control the broadcaster handoff in the same manner (e.g., by reviewing the icons at their respective geo-location, and clicking the appropriate icon to select another broadcaster).

In other implementations, the multi-perspective video sharing engine 202 may create a multi-perspective experience of the same event from different broadcasters having different accounts or from a seemingly unplanned event in the sense that it was not planned to broadcast the event using the interactive video broadcasting service 201. The event may be an unplanned protest unfolding at a certain location(s). A user of the device 250 may execute the interactive streaming application 132 to start a real-time video broadcast stream to capture the protest and share the real-time video broadcast stream with one or more viewers via the interactive video broadcasting service 201. Other users may also use their devices 250 to start real-time video broadcast streams of the protest and share the real-time video broadcast streams via the interactive video broadcasting service 201. As such, there may be multiple users live streaming the same event, which provides different perspectives of the event in terms of viewing angle, comments, appreciation signals, etc. Generally, it is noted that an event may refer to any activity happening at a particular location or across multiple locations.

In some implementations, a user may be viewing a broadcast stream from a broadcaster (and providing/receiving messages or indications in the same manner described above), and the multi-perspective video sharing engine 202 may recommend other related broadcasts from other broadcasters from the same event. In some examples, the multi-perspective video sharing engine 202 may analyze the other broadcasts from the other broadcasters and recommend a subset of video streams from the same event based on certain social media metrics. Then, the multi-perspective video sharing engine 202 may provide a multi-perspective view of the correlated video streams so that the user can obtain a more enhanced viewing experience. The multi-perspective video sharing engine 202 may correlate the video streams either in real-time (e.g., as they are being broadcasted) or stored video broadcasts (e.g., the stored video streams 164 and/or the replays 220) that relate to the same event at a previous time, and present a multi-perspective display on one or more viewers' devices 250 that displays the live broadcast streams concurrently and/or identifies the live/stored video broadcasts based on a certain order (e.g., temporal order from earliest stream to latest stream, or vice versa, or order of popularity based on one or more social media metrics).

The multi-perspective video sharing engine 202 may include a stream correlator 204 for correlating video streams to an event and/or with each other. The stream correlator 204 may use one or more signals or a combination of signals to assist in identifying the broadcast streams and correlating the broadcast streams with a single event and/or with other broadcast streams, as further explained below.

When the broadcasters and/or viewers opt-in or permit the service to collect such information, the stream correlator 204 may obtain location data (e.g., GPS coordinates) and time information (e.g., time stamps of the broadcast streams), and use the location data and the time information to correlate one or more video streams to an event. In some examples, the interactive video broadcasting service 201 may permit the broadcaster to share their location (explicitly) when broadcasting. In other examples, the interactive video broadcasting service 201 may infer the location based on the content of the broadcast, as further explained below. In some examples, the stream correlator 204 may obtain any user-inputted data for a broadcasted video stream (provided by the broadcaster or viewers), and use this information to correlate the video streams to an event. For example, the comments or messages provided by the viewers when watching the streamed video may include information that can be used to identify the event. In one example, the comments or messages may include a hash tag that assists in identifying the events. In other examples, the user may be able to tag the video stream to a particular event (e.g., the user would enter Staples Center, Lakers v. Bucks) when starting to broadcast, and that tag would be used to correlate with other video streams from other broadcasts at the Lakers game at the Staples Center. In some examples, the stream correlator 204 may derive information from the video feed and the audio feed of the video broadcast stream by analyzing the video and audio components, and use this information to identify the video stream and determine whether it relates to an event, as further explained below.

In some implementations, the interactive video broadcasting service 201 may include a video analyzer 206 and an audio analyzer 212 to assist in identifying video streams becoming from the same event. For example, the stream correlator 204 may be configured to compare the results of the video analyzer 206 and/or audio analyzer 212 for each video stream to determine whether two or more video streams are correlated to the same event.

The video analyzer 206 may analyze the video feed to detect relevant pieces of information within the frames of the video, and use this information to determine whether two or more video streams are related to the same event. For example, the video analyzer 206 may include a recognition unit 208 configured to recognize people and/or objects in the video stream. In some examples, the recognition unit 208 may use any type of facial recognition techniques such as identifying facial features by extracting landmarks or features from an image of the subject's face. The recognition unit 208 may include two-dimensional or three-dimensional facial recognition. Also, the recognition unit 208 may use any type of object recognition techniques to identify objects in the frames of the video such as edge matching, divide-and-conquer search, greyscale matching, gradient matching, and/or histograms, etc. The recognition unit 208 may employ these techniques to identify certain objects such as buildings or other landmarks. As such, the recognition unit 208 may detect the number of people in the broadcast video stream, and/or detect people in the broadcast video stream (as opposed to non-human objects) so that the broadcaster can tag certain people he/she recognizes in the broadcast stream. In some examples, the recognition unit 208 may match detected people within the video stream with people within the broadcaster's and/or viewers' social network (e.g., identified by the connection graph 168), and automatically tag them.

The video analyzer 206 may include a frame comparer 210 configured to compare the frames of one video stream to frames of another video stream to determine whether they relate to the same event. In some examples, the frame comparer 210 may obtain a fingerprint of one or more frames of a first video stream, and a fingerprint of one or more frames of a second video stream, and compare these fingerprints to determine whether they are similar enough. The frame comparer 210 may compute a similarity metric indicating a level of relatedness between frame(s) of the first video and frame(s) of the second video), and if the similarity metric is above a certain threshold, then the stream correlator 204 may determine that the first video stream and the second video stream relate to the same event.

The audio analyzer 212 may analyze the audio feed to detect relevant keywords from the speech of the audio associated with the video streams, and use this information to determine whether the broadcasts relate to the same event. The audio analyzer 212 may include a natural language processing (NLP) unit 214 configured to detect keywords from the speech of the audio. The audio analyzer 212 may use any known types of natural language processing to detect keywords from the speech of the audio. Also, the audio analyzer 212 may include an audio comparer 216 configured to compare the audio (or portion thereof) of one broadcast stream with the audio (or portion thereof) of another broadcast stream, and if the sounds of the audio are sufficiently similar or the same, the stream correlator 204 may determine that the first and second broadcast streams are from the same event.

In some examples, the stream correlator 204 may attempt to correlate the video streams to an event based on viewer engagements and/or crowdsourcing information. For example, as the event occurs over time, the stream correlator 204 may obtain user-provided input on the video stream (e.g., tagging the video, tagging objects in the video, keywords, hash tags), and analyze their meaning to determine the origin of the video stream and whether that relates to a relatively popular event. For example, the interactive video broadcasting service 201 can associate detected persons with tags based on input received via the user interface. For example, any of the viewers or the broadcaster can tag information contained in the video stream. A tag may be a link that links one or more terms to an object in the video stream. The interactive video broadcasting service 201 may insert the tag into the broadcast video stream such that the tag persists with the object while the object moves to different positions in the video stream.

Figure 7:
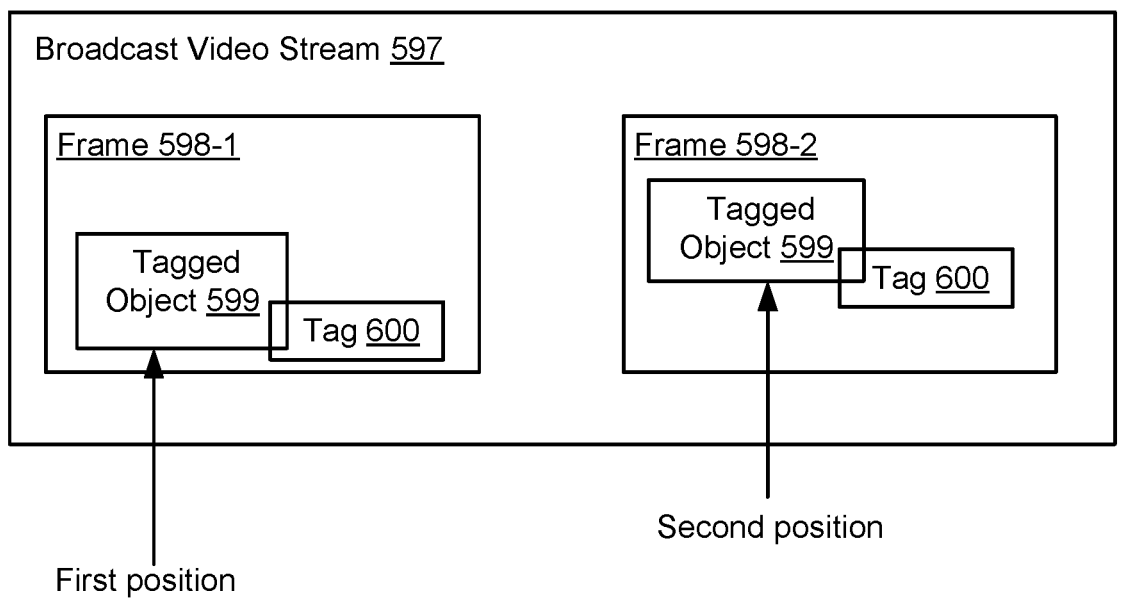
FIG. 7 is a schematic diagram depicting frames of a broadcast stream having a tagged object such that the tag persists through the frames of the broadcast stream according to an implementation.

FIG. 7 is a schematic diagram depicting sequential frames 598 of a broadcast video stream 597 having a tagged object 599 such that a tag 600 persists through the frames 598 of the broadcast video stream 597 according to an implementation. The frames 598 may include a first frame 598-1 and a second frame 598-2. Although the first frame 598-1 and the second frame 598-2 are depicted next to each other, in the live video stream, the second frame 598-2 would follow the first frame 598-1. As shown in FIG. 7, the tagged object 599 moves during a portion of the video, e.g., from the first frame 598-1 to the second frame 598-2. However, the tag 600 may remain persisted to the object 599 as the object 599 moves throughout the video frames. In some examples, the tagged object 599 (e.g., a tagged person) may leave the broadcast, but when the tagged object 599 returns to the broadcast, the object 599 remains tagged (e.g., the object does not lose its tag by leaving the broadcast stream for a period of time).

As shown in FIG. 2, in some examples, the stream correlator 204 may detect the origin and/or relevance of a video stream based on identifiers embedded in a physical object 252. For example, the stream correlator 204 may detect an identifier tag 254 embedded on the physical object 252. The identifier tag 254 may be any type of chip, tag, barcode, or signal that, when read, can identify the particular type of physical object 252. In some examples, the identifier tag 254 uses radio-frequency identification (RFID). However, the identifier tag 254 may use any type of technology for identifying and tracking objects. As such, when the tagged physical object 252 is captured within the video stream, the identifier tag can be read, and information about the tagged physical object may be retrieved, which could indicate information about the underlying event (e.g., the location, object's uniqueness to a certain area, or other video streams having the same tagged physical object 252).

The stream correlator 204 may use a combination of two or more of these signals to determine a level of probability that the video stream relates to a particular event or with another video stream, and if that level of probability is above a threshold value, the stream correlator 204 may identify that video stream as originating from that event. In some examples, the stream correlator 204 may use a weighted scoring algorithm that applies weights to the various signals, and if that score is above a certain threshold, the video stream is identified as originating from that event. In further examples, the stream correlator 204 may use a weighted algorithm that can dynamically adjust weights applied to the various signals to determine whether the video streams are correlated, where the dynamic allocation of weights is determined by the contextual data surrounding the video stream such as the number of people at the event, the number of people broadcasting the event, and/or the amount of user-provided data exchanged between the computing devices. For example, stream correlator 204 may receive density information from a third party service that indicates the density of people in a certain area. When the stream correlator 204 receives an indication that a particular area has a relatively high density value (e.g., lots of users in the area), the GPS coordinates and time information may be less useful for correlating video streams, and the stream correlator 204 may adjust the weight used for the GPS/time data to have a lesser impact on determining whether a video stream can be correlated with the event having a high density of users. However, the stream correlator 204 may use any number of techniques for identifying and correlating video streams with events, or identifying events with streams.

In some examples, the stream correlator 204 may 1) create a baseline level of broadcasts for a given area, and 2) if the broadcasts originating from that area for a given time go beyond the threshold determined to be "normal" for that given time, the stream correlator 204 may automatically create an event, collect additional data, and surface those broadcasts to the interactive streaming application 132. In some examples, the baseline level of broadcasts may refer to the number of broadcasts that are streamed from a particular geographical location. In one example, the baseline level of broadcasts for the downtown area of Milwaukee may be set to 15 broadcasts. If the number of broadcasts from Milwaukee's downtown area is greater than 15 within a given time period (e.g., 12 hour period), the stream correlator 204 may create an event, collect additional information from the broadcasts themselves, and surface those broadcasts to the client application. In some examples, the baseline level of broadcasts may refer to the engagement level for all broadcasts (or a portion of the broadcasts) for a particular area. For example, the engagement level may refer to the amount of engagements with the broadcast streams from a particular area such as the number of social media messages about the broadcast streams, the signals of appreciation, comments, joins, etc. If the level of engagement for a particular area within a given time frame is above the baseline level, the stream correlator 204 may create an event, collection additional information from the broadcasts themselves, and surface those broadcasts to the client application.

In addition, depending on what type of information is known or unknown, the stream correlator 204 may dynamically adjust the number of signals used to determine whether the broadcast streams are correlated. For example, if the stream correlator 204 can identify a particular event associated with the broadcast stream, the stream correlator 204 may enlarge the number of signals or techniques used to identify other broadcast streams by comparing the broadcast stream with the known event to other broadcast streams using video/audio comparison, fingerprinting, GPS coordinates, time stamps, etc. In one example, the stream correlator 204 may use the location information of the devices 250 and time information of the video streams (e.g., when are the video streams being broadcast) to determine whether the video streams are captured from the same location (e.g., whether the location of the devices are within a certain range of each other) and occur of within the general time frame. If these metrics are high enough or above a threshold level, the stream correlator 204 may determine that these video streams are related to each other. In some examples, the stream correlator 204 may use the broadcast metadata 166 for each video stream to identify a particular location related to the event and/or one or more keywords related to the event, and use this information to correlate one or more video streams (e.g., if two or more video streams identify the same or similar locations and/or keywords). In some examples, the broadcast metadata 166 may include tags (e.g., user-provided data that identifies the video stream and/or objects or persons within the video stream), and the stream correlator 204 may use the tags to determine whether two or more video streams are correlated to the same event (e.g., the video streams have one or more of the same or similar tags).

In other examples, the stream correlator 204 may use information from one or more other social networks. For example, the stream correlator 204 may receive a list of keywords relating to a trending event. In some examples, the stream correlator 204 may use the keywords to identify video streams related to the event (e.g., if the broadcast metadata 166 includes one or more of the same or similar keywords as included on the list of keywords relating to the trending event). In some examples, the stream correlator 204 may receive a list of events from the social media platform or other social media platforms that are relatively popular, and the stream correlator 204 may be configured to correlate the live or stored video streams to the events using the list of events. Also, the stream correlator 204 may infer the location of these live events by collecting social media metrics from one or more social media platforms. For example, if "Paris" starts trending, the stream correlator 204 may identify and surface the broadcasts from the location of Paris rather than looking at the broadcasts whose title contain the word Paris.

Also, the multi-perspective video sharing engine 202 may be configured to provide one or more replays 220 associated with a live broadcast stream such that the replays 220 can bring the user up-to-speed regarding the live broadcast stream. For example, suppose a user is viewing a live broadcast stream covering a certain event, but that user has joined the broadcast after the event has begun. In order to bring the user up-to-speed regarding the live broadcast, the multi-perspective video sharing engine 202 may provide one or more replays 220 of highlights of the event during moments of time before the user has joined the broadcast.

The interactive streaming application 132 may include a video editing interface that allows a user to interact with a video editor 218 to annotate, edit, scrub, and augment the broadcast stream, and automatically condense large broadcast streams into summary snippets or include only the most interesting segment to create the replays 220. For example, as explained above, as the broadcast stream is shown to viewers, the viewers may engage with the broadcast stream in real-time by providing engagements which are then tied to the particular times the engagements were generated. The engagements may indicate a relevance/importance/likeness of certain segments of the broadcast. Therefore, the video editor 218 may obtain a histogram of engagement with the broadcast over time that depicts the various levels of engagement over the span of the broadcast. Based on the histogram, the video editor 218 may identify the portions of the broadcast that are associated with a higher amount of engagements, and then create one or more smaller clips that are more targeted to what people thought were relevant. As such, the video editor 218 can gather the segments of the broadcast that have the highest engagement (e.g., an engagement above a certain threshold). Alternatively, the video editor 218 can crop out the segments of the video that were least interesting to the viewers using the histogram.

In some examples, a saved video stream may include a broadcast for a relatively large amount of time, e.g., 3 hours. If a saved video stream is relatively long, it is unlikely that the user will view the saved video stream to purposes of catching up to the live broadcast stream. However, the user may be interested in viewing short segments or snippets of the most interesting parts that happened before the user joined the broadcast. Therefore, in some implementations, the multi-perspective video sharing engine 202 and/or the video editor 218 may provide or identify the replays 220 that are related to the live broadcast stream.

Therefore, the video editor 218 may function as a replay generator that can select shortened clips or video summaries (i.e., the replays 220) that capture past key activities of a developing event, and provide these replays to viewers who did not begin watching until after the past key activities occurred so they may be brought up-to-date with respect to the live event. After the live stream of the event has stopped, these replays 220 (in addition to the full broadcast) may be aggregated chronologically and stored as one or more networked accessible videos so that viewers may opt to watch just the key activities rather than the full event. Optionally, the replays 220 are programmatically selected based on any type and any combination of available information suitable for detecting the occurrence of key activities, examples of which include indications of viewer interest, viewer engagement, and popularity with viewers. An example measure of viewer interest is impression. Example measures of viewer engagement include hearts, comments, and re-Tweets. Example measures of popularity include broadcaster identity, viewer identity, impression, and re-Tweets. (The respective machine learning models for interest, engagement, and popularity may use common information.) The replays 220 may be programmatically selected when the measures of interest, engagement, and popularity reach a threshold level suggesting a reasonable likelihood of an occurrence of a key activity. Parameters of machine learning models and the threshold are adjusted to improve accuracy.

Optionally, frames of the live stream broadcast are programmatically analyzed to detect key activities, either during the broadcast or afterwards, and this information is used in conjunction with the information described above to programmatically select the replays 220 of the broadcast. A change in the appearance of a scoreboard of a softball game is detected, for example, and in conjunction with comments suggesting a home run has been hit and identifying the hitter, and a spike in the number of hearts from viewers connected to the hitter on a social graph, a segment of the broadcast sufficient to capture the home run is selected and made into a replay 220.

Figure 3:
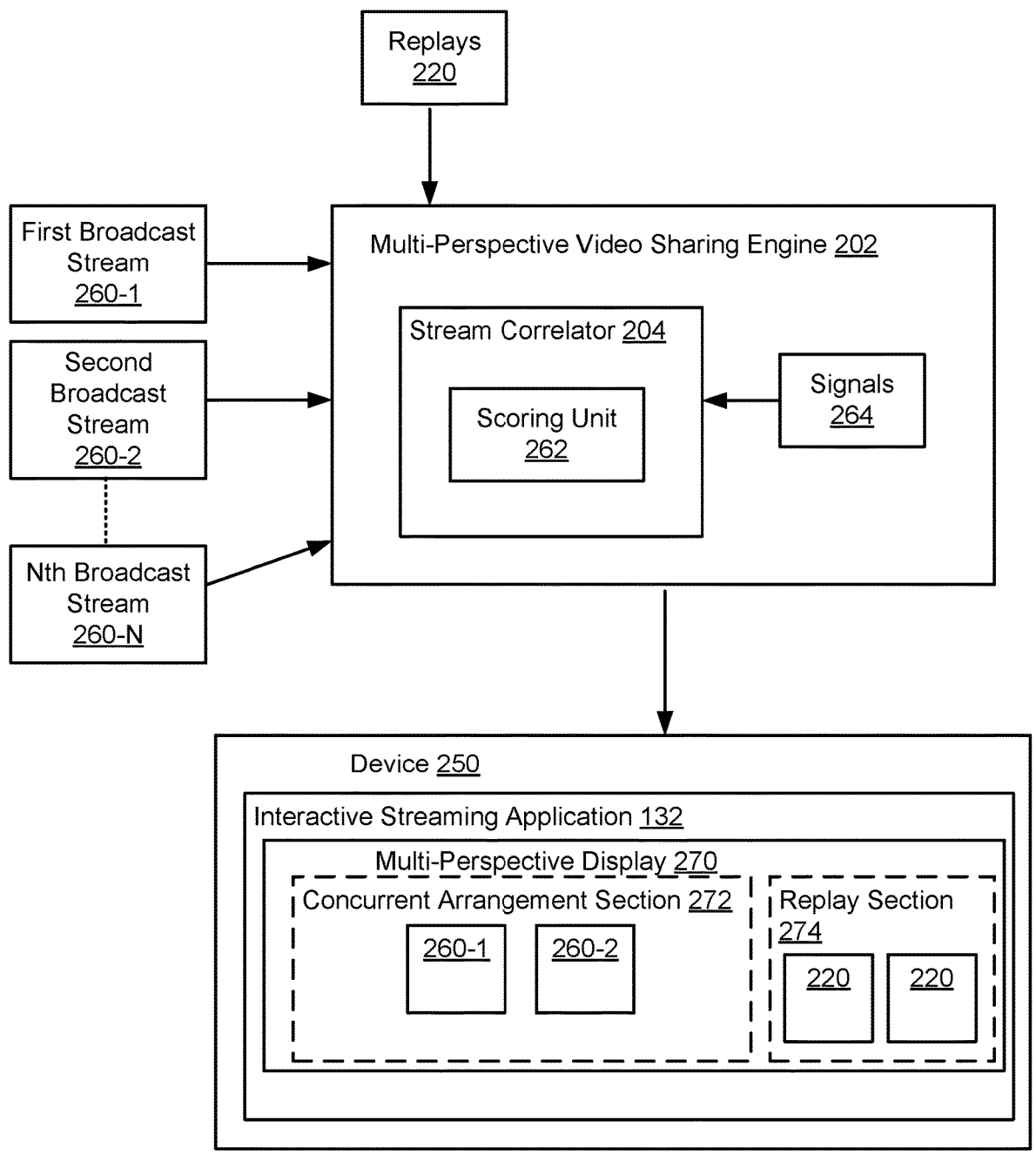
FIG. 3 is a schematic diagram of a multi-perspective video sharing engine of the interactive video broadcasting service and a multi-perspective display of an interactive streaming application of a device according to an implementation.

FIG. 3 is a schematic diagram of the multi-perspective video sharing engine 202 of the interactive video broadcasting service 201 and a multi-perspective display 270 of the interactive streaming application 132 of the device 250 according to an implementation. For example, the stream correlator 204 of the multi-perspective video sharing engine 202 may analyze a number of various broadcast streams (live or stored) (e.g., a first broadcast stream 260-1, and a second broadcast stream 260-2 to Nth broadcast stream-N), as well as the replays 220, to determine whether they originate from the same event. The stream correlator 204 may include a scoring unit 262 that uses signals 264 in a scoring algorithm in order to compute a scoring metric to determine the likelihood of a particular video stream originating from a certain event or being correlated with another video stream. The signals 264 may include location data, time information, user-inputted data (e.g., tags, comments, messages, or other engagements during the broadcasts), and/or video/audio analysis. The scoring unit 262 may use a combination of two or more of these signals 264 to determine the scoring metric representing a level of probability that the video stream relates to a particular event or with another video stream, and if that scoring metric is above a threshold value, the stream correlator 204 may identify that video stream as originating from that event. In some examples, the scoring unit 262 may use a weighted scoring algorithm that applies weights to the various signals 264, and if that score is above a certain threshold, the video stream is identified as originating from that event.

As shown in FIG. 3, the multi-perspective video sharing engine 202 is configured to provide a multi-perspective display 270, over the network 150, to the user interface of the interactive streaming application 132. The multi-perspective display 270 may include a concurrent arrangement section 272 in which the broadcast streams (e.g. the first broadcast stream 260-1 and the second broadcast stream 260-2) have been found to be correlated to the same event. The first and second broadcast streams may be displayed at the same time in different portions of the user interface. In some examples, the multi-perspective display 270 may include a replay section 274 that identifies or lists the replays 220 relating to the same event as the live/stored broadcasts.

Figure 4:
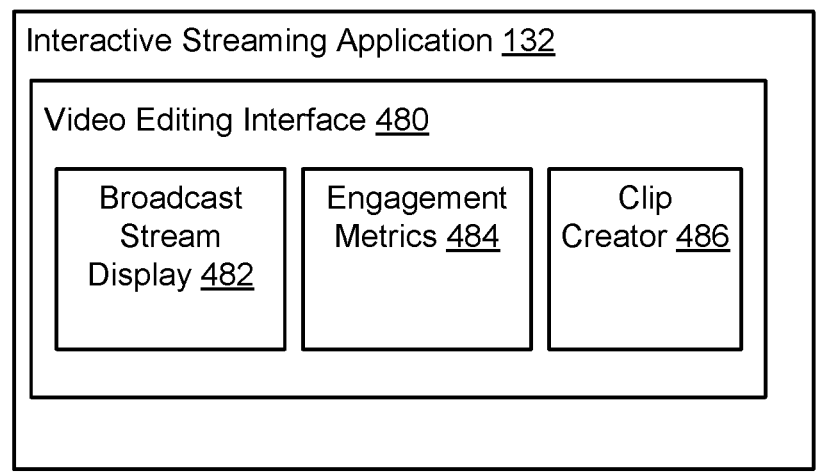
FIG. 4 is a schematic diagram of a video editing interface of the interactive streaming application according to an implementation.

FIG. 4 is a schematic diagram of a video editing interface 480 of the interactive streaming application 132. For example, the video editing interface 480 allows a user to interact with the video editor 218 to annotate, edit, scrub, and augment the broadcast stream, and automatically condense large broadcast streams into summary snippets or include only the most interesting segment to create the replays 220. In some examples, the video editing interface 480 may include a broadcast stream display 482 that displays the saved/lived broadcast stream, and a portion that displays engagement metrics 484 that depicts a level of engagement (e.g., approvals, comments, etc.) over time as the broadcast stream is displayed, and a clip creator 486 that automatically creates smaller clips corresponding to the portions of video having relatively higher levels of engagements.

As shown in FIG. 2, the interactive video broadcasting service 201 may include a contextual data inserter 222 operating in conjunction with one or more third party services 224 to insert contextual data into the broadcast stream. The third party services 224 may be any type of outside service that obtains contextual data that is relevant the event broadcasted by the computing device 102. In a few examples, the third party services 224 may include a translation service that provides translations in the form of captions, a weather service that provides weather information and updates, and a density service that conveys the density of people in a certain area. The contextual data may include any type of data relevant to the underlying event such as translations, captions, speed, movement, weather, or generally any type of information that conveys information about the event that may not be readily apparent from the broadcast stream itself. In a specific example, a runner in a marathon could be wearing a camera device, and this broadcast stream is shared by the interactive video broadcasting service 201 to one or more viewers. The contextual data inserter 222 may insert the speed of the runner, his/her location relative to the length of the race, and the position with respect to other runners over the live broadcast stream as an overlay onto the images of the broadcast video stream. In another example, the contextual data inserter 222 may insert a density metric into the broadcast stream to inform the viewers how many people are located around the broadcaster in order to give the viewers a more rich experience on what the actual event is like. In another example, the contextual data inserter 222 may insert metrics about the weather into the broadcast stream in order to give the viewers a sense of the weather in case it was not apparent from the video itself (e.g., conveying the temperature at Lambeau field during a Packer game in December).

More generally, during the course of the live broadcast, the contextual data inserter 222 may insert the contextual data into the live video stream such that the context information is displayed proximate to the broadcast stream on the viewers' devices and/or the broadcaster's device. The contextual data inserter 222 may provide an overlay object on top of the images of the broadcast stream. In some examples, the contextual data inserter 222 may create the overlay object to have a certain transparency so that the underlying video display is at least partially visible through the overlay object.

Figure 5:
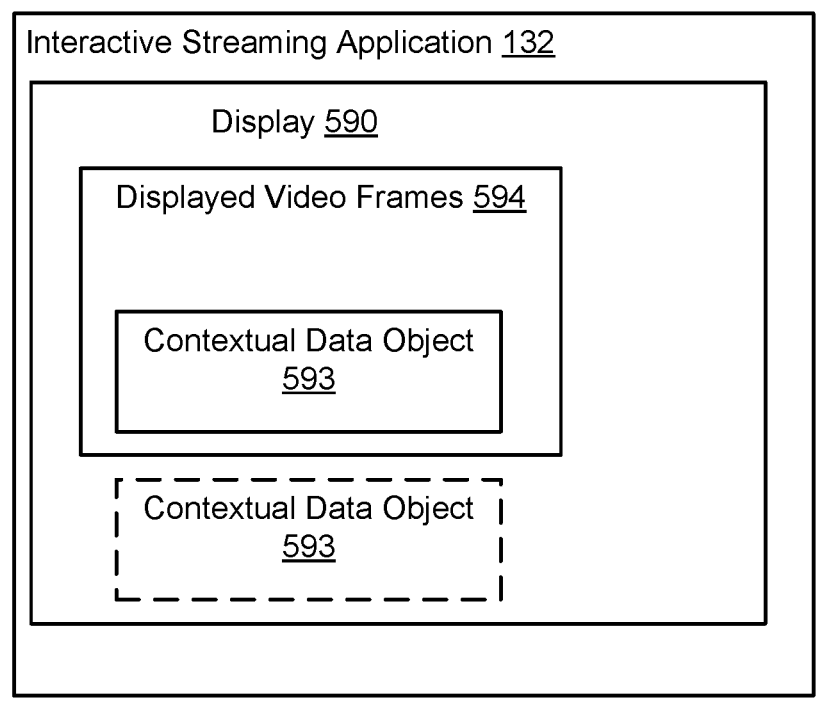
FIG. 5 is a schematic diagram of a video broadcast stream that is enhanced with a contextual data object according to an implementation.

FIG. 5 is a schematic diagram of a video broadcast stream that is enhanced with a contextual data object 593 according to an implementation. For example, the interactive streaming application 132 may define a display 590 that depicts the video broadcast stream. The contextual data inserter 222 may insert the contextual data object 593 carrying the contextual data into the video broadcast stream such that the contextual data object 593 is overlaid on top of a portion of the display video frames 594 of the display 590 or displayed in a position apart from the displayed video frames 594.

As shown in FIG. 2, in other examples, the interactive video broadcasting service 201 may include a video augmentation unit 226 configured to augment the broadcast stream itself incorporate the contextual data into the broadcast stream. For example, instead of placing an overlay on top of the broadcast stream, the video augmentation unit 226 may manipulate the video stream to insert the contextual data.

As explained above, when there are more than a threshold number of viewers on a particular broadcast video stream, the interactive video broadcasting service 201 may limit the chat functionality to a predefined number such as the first N viewers of the broadcast. For example, the interactive video broadcasting service 201 may queue the viewers of a particular broadcast video stream in the order of arrival time, and permit the first N viewers from the top of the queue participate in chat. In other examples, the interactive video broadcasting service 201 may allow everyone to chat but, in some cases, only certain message are seen by the broadcaster (e.g., either the first 100 people or friends/followers of the broadcast and then random people or the most "upvoted" or "liked" comments to the broadcasters).

In other implementations, the interactive video broadcasting service 201 may include a feedback filter unit 228. In the event that the broadcaster has a relatively large number of viewers, the feedback filter unit 228 may determine whether or not certain engagements are to be surfaced back to the broadcaster.

In other words, the feedback filter unit 228 may determine whether video stream feedback submitted by the viewers (e.g., comments, questions) are to be provided on the list of user input questions or comments provided back to the broadcaster during the broadcast. For example, if the broadcaster is very popular having a large amount user feedback, it may be too difficult for the interactive video broadcasting service 201 to provide all the feedback to the broadcaster. As such, the feedback filter unit 228 may operate as a filter that filters out less relevant, less interesting, and/or less popular feedback.

In some examples, the interactive streaming application's user interface may provide a mechanism for providing an indication of approval for a comment or question submitted by a particular viewer (e.g., like button, dislike button, etc.). In more detail, as the particular viewer is viewing the broadcast stream provided by the popular broadcaster, the viewer may see comments and questions submitted by other viewers that are intended for the broadcaster, and the viewer may indicate his/her approval and/or disapproval of a comment or question. As the comment or question is viewed by other viewers, the comment or question may be associated with many indications of approval (e.g., a number of various viewers have indicated his/her approval of that comment). As such, this particular comment or question may rise above other comments and questions, and may be provided back to the broadcaster's user interface.

The feedback filter unit 228 may also use the viewer's credibility rating and/or spammer rating to factor into whether to provide that viewer's comment or question to the broadcaster. In some examples, the viewer's credibility rating may indicate a level of quality associated with the user based on the viewer's history with the interactive video broadcasting service 201 or other social media platforms, and the number of people who follow that user. The spammer rating may indicate the likelihood of being a spammer, which can be inversely correlated with the credibility rating. In addition, the viewer may be correlated with certain topics in which the viewer is considered an expert. As such, if the viewer is considered an expert in a topic related to the broadcast stream, the credibility rating may be higher for that broadcast stream, and the likelihood that the feedback filter unit 228 would surface that viewer's comment or question back to the broadcaster may be higher. As such, in some implementations, the feedback filter unit 228 may evaluate the viewer's indications of approval for the comments or questions, as well as other data such as the viewer's credibility rating and/or spammer rating in a scoring algorithm that determines a score for each of the comments or questions, and if the score is above a certain threshold, the associated comment or question may be surfaced back to the broadcaster. In some implementations, the feedback filter unit 228 may be activated when the number of viewers viewing a particular broadcast exceeds a threshold level or the number of comments or questions submitted by the viewers exceed a threshold level. For instance, the feedback filter unit 228 becomes more relevant as the number of viewers or amount of viewer feedback increases.

In some implementations, the interactive video broadcasting service 201 may include multi-media feedback unit 230 configured to permit the viewer to respond to the broadcast stream with audio or a separate video stream to be provided back to the broadcaster. For example, instead of just responding with text or other indications, the interactive streaming application's user interface may allow the viewer to respond with audio and/or video broadcast streams, which the multi-media feedback unit 230 receives from the viewer's computing device 102 over the network 150, and then determines whether the broadcaster allows multi-media feedback from that viewer. For example, the broadcaster may permit certain associations or groups of associations to respond with audio and/or permit certain associations or groups of associations to respond with video streams. Therefore, if the broadcaster accepts multi-media feedback from that viewer, the multi-media feedback unit 230 may provide the audio and/or video, over the network 150, to the broadcaster for display. In some examples, the multi-media feedback may be overlaid on a portion of the video display. For example, a multi-media feedback object (e.g., square, rectangle) may be positioned over a portion of the video display in a semi-transparent manner. In other examples, the multi-media feedback object may be positioned in other parts of the user interface apart from the video display of the broadcasted stream. In some examples, the broadcaster may allow multiple broadcast feedback streams from a number of different users at the same time, where the broadcast streams are concurrently arranged on the user interface. In some examples, the broadcaster and the multiple viewers may communicate with each other like in a video teleconference situation, where all participants can hear and speak to each other.

In some implementations, the interactive video broadcasting service 201 may include a software development kit (SDK) provider 232 configured to provide a software development kit for the interactive streaming application 132 to third party applications. For example, a third party application may communicate with the interactive video broadcasting service 201 by integrating the software development kit into the third party application. Instead of implementing the interactive streaming application 132 as a stand-alone application on the computing device 102, third party applications may incorporate live stream content into their applications using the provided software development kit.

In some implementations, the interactive video broadcasting service 201 may include a video remote controller 234 configured to receive feedback from the viewers regarding the video stream, and make or recommend adjustments related to the capturing of the event. For example, the video remote controller 234 may receive feedback from the viewers regarding a perspective of the camera 116, and recommend or adjust the camera 116 based on the viewers feedback. For example, the video remote controller 234 may analyze the comments provided by viewers, determine that a number of comments relate to the viewing angle of the camera 116, and determine a recommendation to address these comments such as moving the camera 116 to the right or left. In some implementations, the device 250 is a robot device such as a drone that is broadcasting a live broadcast stream at an event, and this broadcast stream is shared with a number of viewers. In one example, the camera 116 on the drone is turned slightly to the right so that a portion of the event is not being transmitted. While viewing the drone's broadcast, the viewers may comment using the interactive streaming application's user interface that the camera 116 should turn lightly to the left to capture the missing portion. If there are a number of these or similar comments from other viewers, the video remote controller 234 may manipulate the drone or control operations of the drone directly. It is noted that the drone example is used for explanatory purposes only, where the concepts of the video remote controller 234 may be applied to any type of devices.

The system 200 may be used in conjunction with a plurality of devices (e.g. Internet of Things (IoT)) capable of connecting to the network 150 (and thus to the interactive video broadcasting service 201) either directly or indirectly (e.g., through the device 250), where the plurality of devices may include the device 250 and other sensor devices 256. The sensor devices 256 may be other network-enabled video devices or other network-enabled non-video devices such as sound, temperature, and motion devices. The sensor devices 256 may be IoT in which objects (which can include humans or animals) have a component capable of connecting to a network. The sensor devices 256 may not necessarily be connected to the device 250 but could be in proximity to the device 250, or a sensor device 256 may be connected to the device 250 (wired or wirelessly). In some implementations, the interactive video broadcasting service 201 may include a sensor manager 240 configured to obtain sensed data by the sensor devices 256, and transfer that sensed data to one or more of the other components of the interactive video broadcasting service 201. For example, the sensed data may provide additional contextual data that could be used by the contextual data inserter 222, the feedback filter unit 228, other types of content aggregation, and the multi-perspective video sharing engine 202.

In some examples, the sensor device 256 may be a presence sensor 258 that may be separate from the device 250 or included as part of the device 250. The presence sensor 258 (when activated by the user) may sense the presence of other sensor devices 256 within a distance of the presence sensor 258. For instance, if the presence sensor 258 is within the vicinity of another sensor device 256, the presence sensor 258 may detect this sensor and then obtain and exchange information with this sensor over a certain protocol. This information may be communicated back to the sensor manager 240 which is directed to one or more of the other components.

In another example, the sensor device 256 may be a motion sensor, and when movement is detected, the device 250 may start a live video broadcast stream and share it using the interactive video broadcasting service 201. In other examples, the broadcast stream may be transferred among the sensor devices 256. For example, a viewer may be viewing a broadcast stream on his/her mobile device, and then the viewer enters his/her car (equipped with a video display), the broadcast stream may be transferred from the mobile device to the car's display.

In some implementations, the interactive video broadcasting service 201 may include a stream and media promoter 236 configured to promote certain broadcast streams from registered advertisers 238, and rank the promoted broadcast streams in the streams section of the interactive streaming application's user interface. In some implementations, the stream and media promoter 236 may collect statistics associated the video streams, and the stream and media promoter 236 may use these statistics to price advertising or indicate effectiveness of promoted broadcast streams. For example, the broadcast metadata may include statistics about the number of viewers, how long viewers watched the broadcast, and can include the number of signals of appreciation, the number of comments, the number of shares by viewers, the average number of signals of appreciation per second, the average number of comments received per second (or ten seconds, etc.), the highest number of signals of appreciation received in a five second period, etc. In some examples, the statistics may include the area or location on which the signals of appreciation are being given. For example, the stream and media promotor 236 may collect statistics on which region of the screen the signals of appreciation were given, and if viewers are "tapping" certain objects in the broadcast. These types of statistics may provide insight into which action, product, or object viewers are engaging with. In some examples, the stream and media promoter 236 may provide a visual representation of these statistics such as a graph, chart, etc. In some examples, the stream and media promoter 236 may use these statistics to automatically determine a level of effectiveness of a promoted stream. For example, if one or more of these metrics is above a threshold level, the stream and media promoter 236 may determine that the promoted stream has a relatively high effectiveness level.

Figure 8:
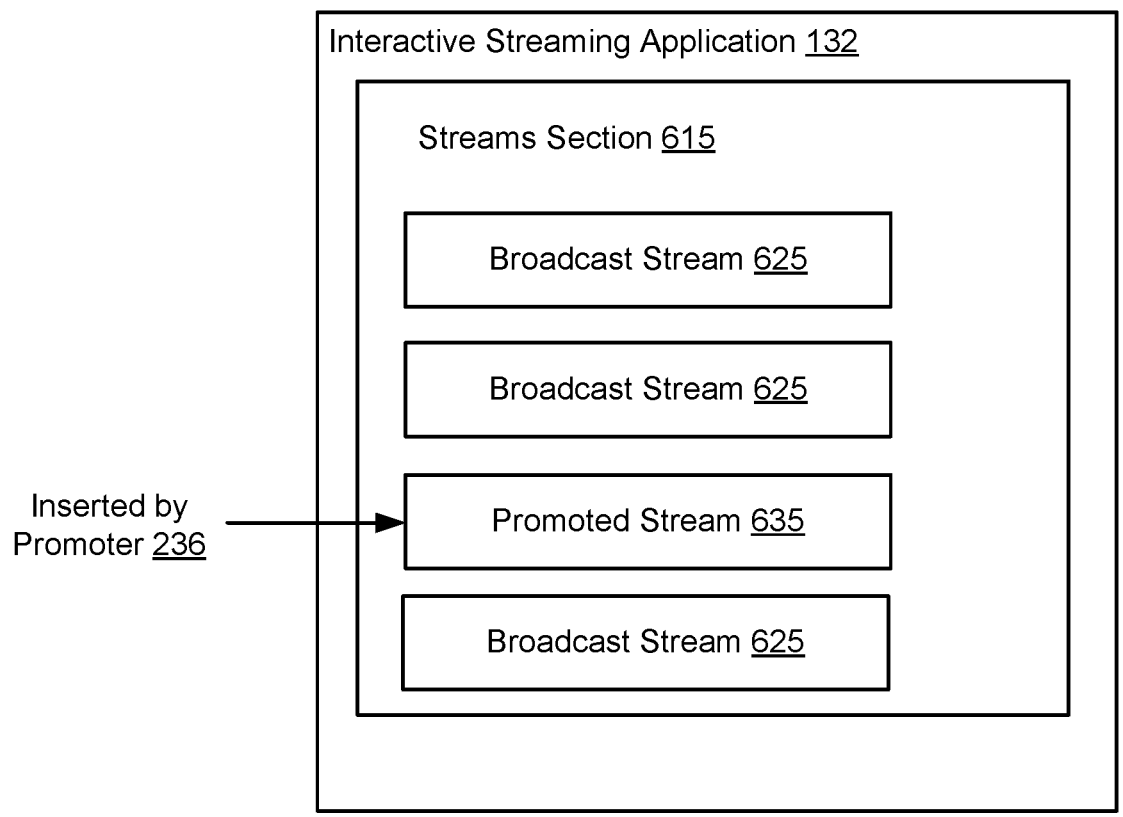
FIG. 8 is a schematic diagram of a list of streams section with an inserted promoted stream according to an implementation.

FIG. 8 is a schematic diagram of the streams section 615 with an inserted promoted stream 635 among other broadcast streams 625. For example, the interactive streaming application 132 may define the stream section 615 as a portion of the user interface that lists recommended broadcast streams 625 from connected users in a social media platform, popular users, and/or popular broadcast streams. The stream and media promoter 236 may be configured to rank certain promoted streams, and then insert the promoted streams into the user's list of recommended video streams.

Also, the stream and media promoter 236 may be configured to insert a video streaming advertisement in the form of an overlay proximate to the broadcast stream. The video streaming advertisement may be a separate live stream from a registered advertiser 238. In some cases, the promoted broadcast stream may be displayed concurrently with the broadcast stream. In some examples, the stream and media promoter 236 may operate in conjunction with the video augmentation unit 226 configured to augment the video to assert advertising content into the actual broadcast video. For example, the video augmentation unit 226 may be configured to detect a certain area or object of the broadcast video, and then insert an advertising object in that area or replace an object from the broadcast stream such that the advertising object behaves like a three-dimensional object in the broadcast stream. The video augmentation performed by the video augmentation unit 226 is different than inserting a static advertisement into the video, but rather inserts a three-dimensional object into the video in a manner that it is linked to the video (e.g., as if the advertising object is an element being viewed from the perspective of the camera).

Figure 6:
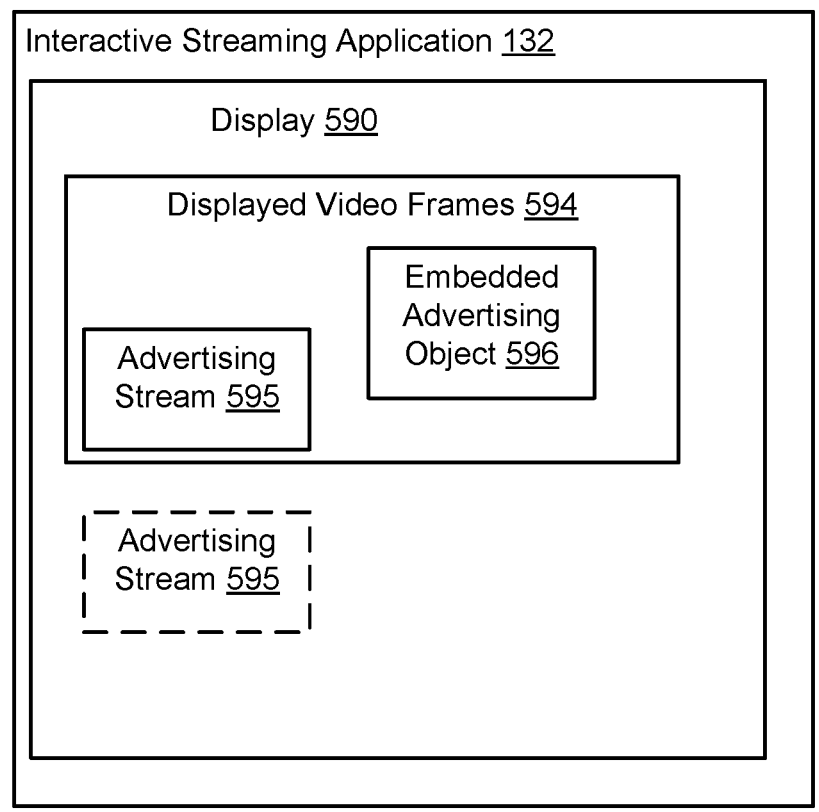
FIG. 6 is a schematic diagram of a video broadcast stream that is enhanced with an advertising stream and/or augmented with an altered object representing the physical object according to an implementation.

FIG. 6 is a schematic diagram of a video broadcast stream that is enhanced with an advertising stream 595 and/or augmented with an embedded advertising object 596. For example, the interactive streaming application 132 defines a display 590 that provides the displayed video frames 594. The stream and media promoter 236 may insert the advertising stream 595 in the form of an overlay proximate to the broadcast stream (e.g., on top of the broadcast stream or part from the broadcast stream). In addition, the stream and media promoter 236 may operate in conjunction with the video augmentation unit 226 configured to augment the broadcast stream to embed the advertising object 596. For example, the video augmentation unit 226 may be configured to detect a certain area or object of the broadcast video, and then insert the advertising object 596 in that area or replace an object from the broadcast stream such that the embedded advertising object 596 behaves like a three-dimensional object in the broadcast stream. In some examples, the video augmentation unit 226 may replace text or a logo in the broadcast stream with different text or a different logo in order to promote a certain product or brand.

In shown in FIG. 2, the stream and media promoter 236 may operate in conjunction with the video augmentation unit 226 to insert a selectable advertising object to replace of the physical object 252 with the embedded identifier tag 254. For instance, merchants may embed identifier tags 254 in various different physical objects 252. Then, when the physical object 252 appears in the broadcast stream, the stream and media promoter 236 may detect and read the identifier tag 254, and then instruct the video augmentation unit 226 to insert a selectable object that resembles the physical object 252, but now it is a selectable link that is directed to the merchant's website or provides additional information about the physical object 252. In one specific example, a basketball may be embedded with an RFID tag. When the broadcaster captures the basketball in the broadcast stream (e.g., when it comes into the perspective of the camera), the stream and media promoter 236 may read the RFID tag to identify the type of basketball, and then instruct the video augmentation unit 226 to place the video representation of the basketball with an augmented version of the basketball that becomes clickable. The selection of the basketball causes the device 250 to be directed to a certain URL or the interactive streaming application displays additional information about the basketball.

It is noted that although the components of the interactive video broadcasting service 201 are depicted on the server-side, some or all of one or more of these components may be implemented on the client-side, e.g., on the device 250.

Figure 9:
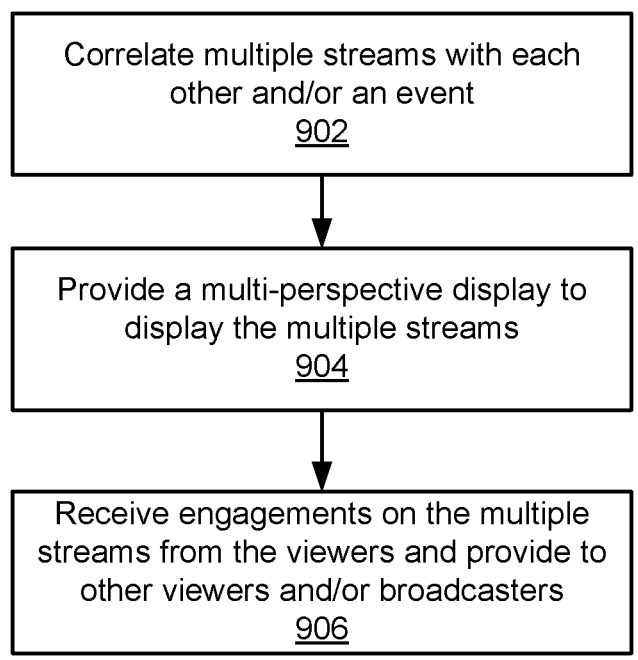
FIG. 9 is a flowchart depicting example operations of the system of FIG. 2 according to an implementation.

FIG. 9 illustrates a flow chart illustrating a method 900 depicting example operations of the interactive video broadcasting service 201.

Multiple streams may be correlated with each other and/or an event (902). For example, the stream correlator 204 may analyze a number of various broadcast streams (live or stored), as well as the replays 220, to determine whether they originate from the same event. The stream correlator 204 may use signals in a scoring algorithm in order to compute a scoring metric to determine the likelihood of a particular video stream originating from a certain event or being correlated with another video stream. The signals may include location data, time information, user-inputted data (e.g., tags, comments, messages, or other engagements during the broadcasts), and/or video/audio analysis.

A multi-perspective display may be provided to display the multiple streams (904). The multi-perspective video sharing engine 202 may provide a multi-perspective display, over the network 150, to the user interface of the interactive streaming application 132. The multi-perspective display concurrently displays the multiple broadcasts streaming from the same event and/or the replays 220 that provide a quick summary for past activities of the event. Engagements on the multiple streams may be received, and then provided to other viewers and/or broadcasters (906). For example, the interactive video broadcasting service 201 may receive engagements from the viewers on each broadcast stream, which are then shared with the other viewers and/or the broadcasters.

Figure 10:
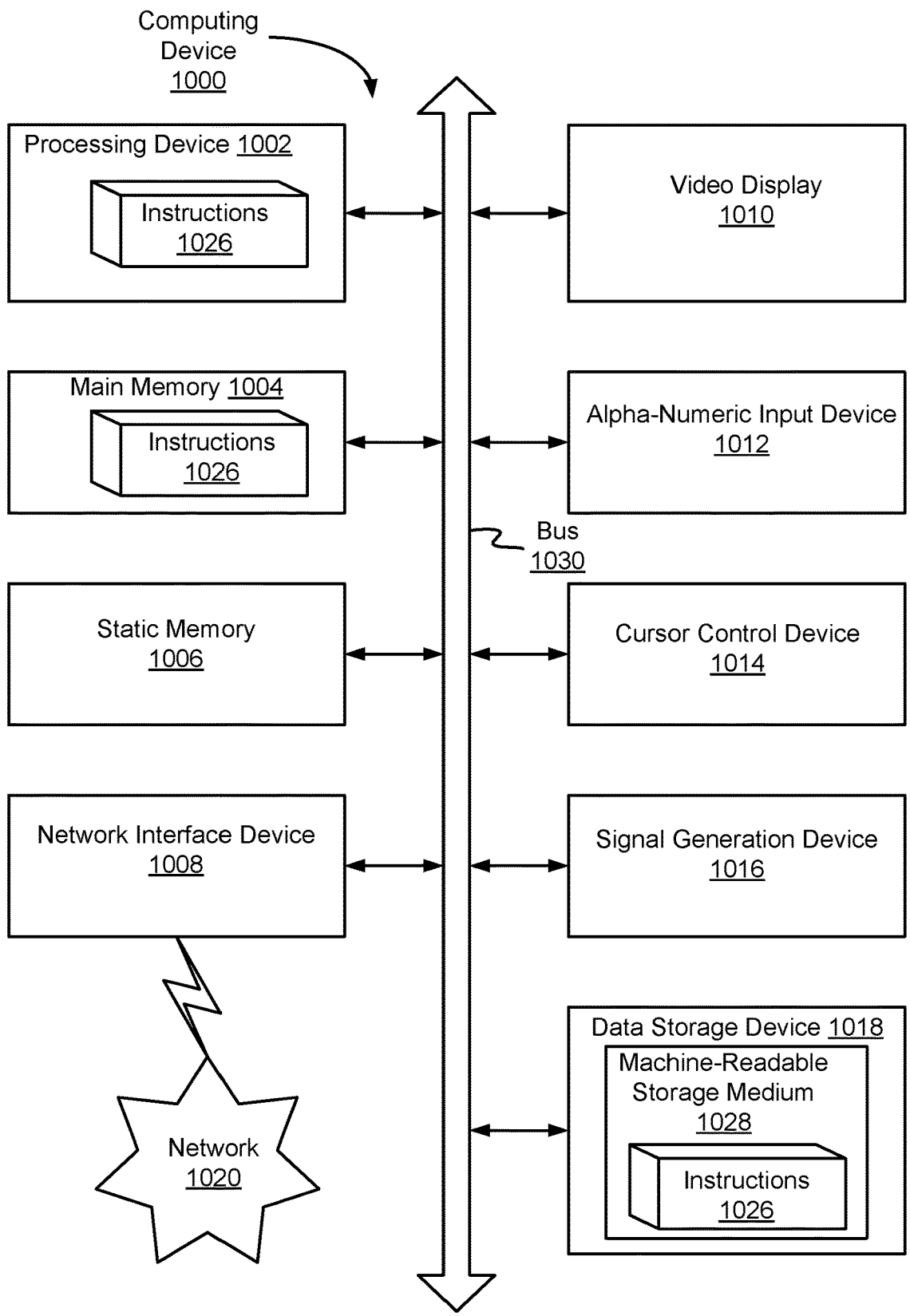
FIG. 10 shows an example of a computer device and a mobile computer device that can be used to implement the techniques described here.

FIG. 10 illustrates a diagrammatic representation of a machine in the example form of a computing device 1000 within which a set of instructions, for causing the machine to perform any one or more of the methodologies discussed herein, may be executed. The computing device 1000 may be a mobile phone, a smart phone, a netbook computer, a rackmount server, a router computer, a server computer, a personal computer, a mainframe computer, a laptop computer, a tablet computer, a desktop computer etc., within which a set of instructions, for causing the machine to perform any one or more of the methodologies discussed herein, may be executed. In one implementation, the computing device 1000 may present an overlay UI to a user (as discussed above). In alternative implementations, the machine may be connected (e.g., networked) to other machines in a LAN, an intranet, an extranet, or the Internet. The machine may operate in the capacity of a server machine in client-server network environment. The machine may be a personal computer (PC), a set-top box (STB), a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computing device 1000 includes a processing device (e.g., a processor) 1002, a main memory 1004 (e.g., read-only memory (ROM), flash memory, dynamic random access memory (DRAM) such as synchronous DRAM (SDRAM)), a static memory 1006 (e.g., flash memory, static random access memory (SRAM)) and a data storage device 1018, which communicate with each other via a bus 1030.

Processing device 1002 represents one or more general-purpose processing devices such as a microprocessor, central processing unit, or the like. More particularly, the processing device 1002 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 1002 may also be one or more special-purpose processing devices such as an application specific integrated circuit (ASIC), a field programmable gate array (FPGA), a digital signal processor (DSP), network processor, or the like. The processing device 1002 is configured to execute instructions 1026 (e.g., instructions for an application ranking system) for performing the operations and steps discussed herein.

The computing device 1000 may further include a network interface device 1008 which may communicate with a network 1020. The computing device 1000 also may include a video display unit 1010 (e.g., a liquid crystal display (LCD) or a cathode ray tube (CRT)), an alphanumeric input device 1012 (e.g., a keyboard), a cursor control device 1014 (e.g., a mouse) and a signal generation device 1016 (e.g., a speaker). In one implementation, the video display unit 1010, the alphanumeric input device 1012, and the cursor control device 1014 may be combined into a single component or device (e.g., an LCD touch screen).

The data storage device 1018 may include a computer-readable storage medium 1028 on which is stored one or more sets of instructions 1026 (e.g., instructions for the application ranking system) embodying any one or more of the methodologies or functions described herein. The instructions 1026 may also reside, completely or at least partially, within the main memory 1004 and/or within the processing device 1002 during execution thereof by the computing device 1000, the main memory 1004 and the processing device 1002 also constituting computer-readable media. The instructions may further be transmitted or received over a network 1020 via the network interface device 1008.

While the computer-readable storage medium 1028 is shown in an example implementation to be a single medium, the term "computer-readable storage medium" should be taken to include a single medium or multiple media (e.g., a centralized or distributed database and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media and magnetic media.

In the above description, numerous details are set forth. It will be apparent, however, to one of ordinary skill in the art having the benefit of this disclosure, that implementations of the disclosure may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "identifying," "determining," "calculating," "updating," "transmitting," "receiving," "generating," "changing," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Implementations of the disclosure also relate to an apparatus for performing the operations herein. This apparatus may be specially constructed for the required purposes, or it may comprise a general purpose computer selectively activated or reconfigured by a computer program stored in the computer. Such a computer program may be stored in a non-transitory computer readable storage medium, such as, but not limited to, any type of disk including floppy disks, optical disks, CD-ROMs and magnetic-optical disks, read-only memories (ROMs), random access memories (RAMs), EPROMs, EEPROMs, magnetic or optical cards, flash memory, or any type of media suitable for storing electronic instructions.

The words "example" or "exemplary" are used herein to mean serving as an example, instance, or illustration. Any aspect or design described herein as "example' or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an implementation" or "one embodiment" or "an implementation" or "one implementation" throughout is not intended to mean the same embodiment or implementation unless described as such. Furthermore, the terms "first," "second," "third," "fourth," etc. as used herein are meant as labels to distinguish among different elements and may not necessarily have an ordinal meaning according to their numerical designation.

The algorithms and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear from the description below. In addition, the present disclosure is not described with reference to any particular programming language. It will be appreciated that a variety of programming languages may be used to implement the teachings of the disclosure as described herein.

The above description sets forth numerous specific details such as examples of specific systems, components, methods and so forth, in order to provide a good understanding of several implementations of the present disclosure. It will be apparent to one skilled in the art, however, that at least some implementations of the present disclosure may be practiced without these specific details. In other instances, well-known components or methods are not described in detail or are presented in simple block diagram format in order to avoid unnecessarily obscuring the present disclosure. Thus, the specific details set forth above are merely examples. Particular implementations may vary from these example details and still be contemplated to be within the scope of the present disclosure.

It is to be understood that the above description is intended to be illustrative and not restrictive. Many other implementations will be apparent to those of skill in the art upon reading and understanding the above description. The scope of the disclosure should, therefore, be determined with reference to the appended claims, along with the full scope of equivalents to which such claims are entitled.

What is claimed is:

1. A system comprising:
a video broadcasting platform, executable by a server, configured to enable a plurality of source devices to broadcast live feed video streams, over a network, to a plurality of viewing devices; and
a client application, executable by a first source device, configured to render a timeline of social content from accounts linked to an account of a user of the client application in a connection graph, the client application configured to broadcast a first live feed video stream via the video broadcasting platform to the plurality of viewing devices, the client application including a transcoding engine configured to determine a bandwidth between the first source device and the server and reduce a video quality of the first live feed video stream sent to the server in response to the bandwidth being below a threshold level such that the transcoding engine sets the video quality for all viewing devices based on the bandwidth available to the first source device,
wherein the video broadcasting platform is configured to:
programmatically determine that the first live feed video stream and a second live feed video stream captured by a second source device are related to a same event based on a plurality of signals, the plurality of signals including location data of the first source device and location data of the second source device;
provide the first and second live feed video streams, over the network, to a viewing device for viewing;
associate real-time engagements with times in the first live feed video stream based on timestamp packets that have been added to frames in the first live feed video stream by the plurality of viewing devices;
provide, over the network, indications of the real-time engagements to the viewing device and the first source device during a course of the first live feed video stream such that the real-time engagements are provided back to the viewing device and the first source device within a latency period, the latency period being two seconds or less from when a viewing device has generated a real-time engagement, wherein icons representing the real-time engagements are triggered to be displayed on the client application within the latency period based on the associated times and removed when a predetermined interval elapses after the associated times.

2. The system of claim 1, further comprising:

a replay generator configured to generate one or more replays of at least one of the first or second live feed video streams, the one or more replays including one or more video clips that capture past key activities of the event, the replay generator configured to provide access to the one or more replays such that a replay can be selected to view the past key activities of the event instead of the whole live feed video stream.

3. The system of claim 1, wherein the video broadcasting platform is configured to create the event in response to a number of real-time engagements with live feed video streams broadcasted within a geographical area in a time period exceeding a threshold amount.

4. The system of claim 1, wherein the video broadcasting platform includes a video analyzer configured to analyze video of the first and second live feed video streams, and an audio analyzer configured to analyze audio of the first and second live feed video streams, wherein the video broadcasting platform is configured to programmatically determine that the first and second live feed video streams relate to the same event based on results of the video analyzer and the audio analyzer.

5. The system of claim 1, wherein the icons move from a first location to a second location during the predetermined interval.

6. The system of claim 1, wherein the video broadcasting platform is configured to detect and read a tag identifier of a physical object in one of the first and second live feed video streams, the video broadcasting platform configured to identify the physical object based on the tag identifier, wherein the video broadcasting platform is configured to use information from the tag identifier in the determination of whether the first and second live feed video streams relate to the same event.

7. The system of claim 1, wherein the video broadcasting platform includes a contextual data inserter configured to insert contextual data about the event into one of the first and second live feed video streams.

8. The system of claim 1, wherein the video broadcasting platform includes a video augmentation unit configured to augment the first live feed video stream to insert contextual data about the event into frames of video of the first live feed video stream.

9. The system of claim 1, wherein the video broadcasting platform includes a video remote controller configured to control an operation of a camera on the first source device, the video remote controller being configured to control the operation of the camera based on the real-time engagements.

10. The system of claim 1, wherein a timestamp packet is added in response to receipt of a user gesture on a user interface displaying the first live feed video stream.

11. The system of claim 1, wherein the video broadcasting platform is configured to detect and read a tag identifier of a physical object captured in the first live feed video stream, the video broadcasting platform configured to identify the physical object based on the tag identifier, wherein the video broadcasting platform includes a video augmentation unit configured to augment the first live feed video stream to include a selectable representation of the physical object.

12. A computer-implemented method comprising:

rendering, by a client application executable by a first source device, a timeline of social content from accounts linked to an account of a user of the client application in a connection graph;

determining, by the client application, a bandwidth between the first source device and a server executing a video broadcasting platform;

reducing, by the client application, a video quality of a first live feed video stream captured by the first source device in response to the bandwidth being below a threshold level;

setting, by the client application, the video quality for all viewing devices based on the bandwidth available to the first source device;

broadcasting, via the video broadcasting platform, the first live feed video stream to a plurality of viewing devices;

programmatically determining that the first live feed video stream and a second live feed video stream captured by a second source device are related to a same event based on a plurality of signals;

providing the first and second live feed video streams, over a network, to a viewing device for viewing;

associating real-time engagements with times in the first live feed video stream based on timestamp packets that have been added to frames in the first live feed video stream by the plurality of viewing devices; and providing, over the network, indications of the real-time engagements to the viewing device and the first source device during a course of the first live feed video stream such that the real-time engagements are provided back to the viewing device and the first source device within a latency period, the latency period being two seconds or less from when a viewing device has generated a real-time engagement, wherein icons representing the real-time engagements are triggered to be displayed on the client application within the latency period based on the associated times and removed when a predetermined interval elapses after the associated times.

13. The computer-implemented method of claim 12, further comprising:

providing, by the video broadcasting platform, a suggested real-time video stream for viewing by the user of the client application based on broadcast metadata associated with video streams shared on the video broadcasting platform.

14. The computer-implemented method of claim 12, wherein the programmatically determining includes:

computing a score for the first live feed video stream that indicates a level of similarity to the second live feed video stream using a weighted scoring algorithm that applies weights to the plurality of signals; and determining that the first live feed video stream is correlated with the second live feed video stream when the score is above or equal to a threshold value.

15. The computer-implemented method of claim 12, wherein the first live feed video stream is captured at a first location, and the second live feed video stream is captured at a second location, the first live feed video stream being displayed first, the method further comprising:

switching from the first live feed video stream to the second live feed video stream as the event progress.

16. The computer-implemented method of claim 12, further comprising:

dynamically increasing, by the video broadcasting platform, a number of the plurality of signals used to determine that video streams are related to the same event in response to one or more of the plurality of signals being determined as unknown.

17. A non-transitory computer-readable medium storing executable code, that when executed by at least one processor, are configured to cause an video broadcasting platform implemented on a server to:

render, by a client application executable by a first source device, a timeline of social content including a list of video streams shared on the video broadcasting platform from accounts linked to an account of a user of the client application in a connection graph;

determine, by the client application, a bandwidth between the first source device and the server;

reduce, by the client application, a video quality of a first live feed video stream captured by the first source device in response to the bandwidth being below a threshold level;

set, by the client application, the video quality for all viewing devices based on the bandwidth available to the first source device;

broadcast, via the video broadcasting platform, the first live feed video stream to a plurality of viewing devices;

programmatically determine that the first live feed video stream and a second live feed video stream captured by a second source device are related to a same event based on a plurality of signals, the plurality of signals including location data of the first source device and location data of the second source device;

provide the first and second live feed video streams, over a network, to a viewing device for selection;

associate real-time engagements with times in the first live feed video stream based on timestamp packets that have been added to frames in the first live feed video stream by the plurality of viewing devices;

provide, over the network, indications of the real-time engagements to the viewing device and the first source device during a course of the first live feed video stream such that the real-time engagements are provided back to the viewing device and the first source device within a latency period, the latency period being two seconds or less from when a viewing device has generated a real-time engagement, wherein icons representing the real-time engagements are triggered to be displayed within the latency period based on the associated times and removed when a predetermined interval elapses after the associated times, wherein the icons move from a first location to a second location during the predetermined interval.

18. The non-transitory computer-readable medium of claim 17, wherein the executable code to programmatically determine that the first live feed video stream and the second live feed video stream are related to the same event includes executable code to automatically correlate the first live feed video stream and the second live feed video stream based on an amount of the real-time engagements associated with the first live feed video stream and an amount of real-time engagements associated with the second live feed video stream.

19. The non-transitory computer-readable medium of claim 17, wherein the plurality of signals include a list of keywords relating to a trending event from a social media platform in communication with the video broadcasting platform.

20. The non-transitory computer-readable medium of claim 17, wherein the executable code to programmatically determine that the first live feed video stream and the second live feed video stream are related to the same event includes executable code to compute a score for the first live feed video stream and the second live feed video stream using a weighted scoring algorithm that dynamically adjusts weights applied to the plurality of signals.

21. The method of claim 12, further comprising:

receiving a user-provided comment on the first live feed video stream;

determining whether to transmit the user-provided comment back to the first source device based on at least one of a credibility rating or spammer rating; and preventing the user-provided comment from being transmitted back to the first source device in response to the spammer rating being above a threshold level.

22. The system of claim 1, wherein the video broadcasting platform is configured to determine, using the connection graph, the accounts linked to the account of the user of the client application, the video broadcasting platform configured to transmit a notification to computing devices associated with the accounts to notify users of the accounts about the first live feed video stream.

* * * * *